(12) United States Patent
Kato et al.

(10) Patent No.: US 8,047,445 B2
(45) Date of Patent: Nov. 1, 2011

(54) WIRELESS IC DEVICE AND METHOD OF MANUFACTURING THE SAME

(75) Inventors: Noboru Kato, Moriyama (JP); Jun Sasaki, Kyoto (JP); Satoshi Ishino, Kusatsu (JP); Katsumi Taniguchi, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 12/940,103

(22) Filed: Nov. 5, 2010

(65) Prior Publication Data

US 2011/0049249 A1 Mar. 3, 2011

Related U.S. Application Data

(63) Continuation of application No. PCT/JP2009/056698, filed on Mar. 31, 2009, and a continuation of application No. PCT/JP2009/059259, filed on May 20, 2009.

(30) Foreign Application Priority Data

May 22, 2008 (JP) .................................. 2008-133829

(51) Int. Cl.
*G06K 19/06* (2006.01)

(52) U.S. Cl. ........................................ 235/492; 235/487

(58) Field of Classification Search .................. 235/375, 235/385, 435, 492, 487, 494; 340/572.7
See application file for complete search history.

(56) References Cited

U.S. PATENT DOCUMENTS

| | | | |
|---|---|---|---|
| 3,364,564 A | 1/1968 | Kurtz et al. |
| 4,794,397 A | 12/1988 | Ohe et al. |
| 5,232,765 A | 8/1993 | Yano et al. |
| 5,253,969 A | 10/1993 | Richert |
| 5,337,063 A | 8/1994 | Takahira |
| 5,374,937 A | 12/1994 | Tsunekawa et al. |
| 5,399,060 A | 3/1995 | Richert |
| 5,491,483 A | 2/1996 | D'Hont |
| 5,528,222 A | 6/1996 | Moskowitz et al. |
| 5,757,074 A | 5/1998 | Matloubian et al. |
| 5,854,480 A | 12/1998 | Noto |
| 5,903,239 A | 5/1999 | Takahashi et al. |
| 5,936,150 A | 8/1999 | Kobrin et al. |
| 5,955,723 A | 9/1999 | Reiner |
| 5,995,006 A | 11/1999 | Walsh |

(Continued)

FOREIGN PATENT DOCUMENTS

DE 10 2006 057 369 A1 6/2008
(Continued)

OTHER PUBLICATIONS

Official communication issued in Japanese Application No. 2007-531524, mailed on Sep. 11, 2007.

(Continued)

*Primary Examiner* — Daniel Hess
*Assistant Examiner* — Paultep Savusdiphol
(74) *Attorney, Agent, or Firm* — Keating & Bennett, LLP

(57) ABSTRACT

A wireless IC device includes a plurality of insulating sheets that are stacked on top of one another. Coil electrodes are arranged so as to sandwich the insulating sheets therebetween and define an antenna coil by being connected to one another. The coil electrodes are superposed with one another and thereby define a single ring when viewed in plan from a z-axis direction.

16 Claims, 18 Drawing Sheets

U.S. PATENT DOCUMENTS

| | | | |
|---|---|---|---|
| 6,104,311 | A | 8/2000 | Lastinger |
| 6,107,920 | A | 8/2000 | Eberhardt et al. |
| 6,172,608 | B1 | 1/2001 | Cole |
| 6,181,287 | B1 * | 1/2001 | Beigel ............... 343/741 |
| 6,190,942 | B1 | 2/2001 | Wilm et al. |
| 6,249,258 | B1 | 6/2001 | Bloch et al. |
| 6,259,369 | B1 | 7/2001 | Monico |
| 6,271,803 | B1 | 8/2001 | Watanabe et al. |
| 6,335,686 | B1 | 1/2002 | Goff et al. |
| 6,362,784 | B1 * | 3/2002 | Kane et al. ............. 343/700 MS |
| 6,367,143 | B1 * | 4/2002 | Sugimura ................... 29/602.1 |
| 6,378,774 | B1 | 4/2002 | Emori et al. |
| 6,406,990 | B1 | 6/2002 | Kawai |
| 6,448,874 | B1 | 9/2002 | Shiino et al. |
| 6,462,716 | B1 | 10/2002 | Kushihi |
| 6,542,050 | B1 | 4/2003 | Arai et al. |
| 6,600,459 | B2 | 7/2003 | Yokoshima et al. |
| 6,634,564 | B2 | 10/2003 | Kuramochi |
| 6,664,645 | B2 | 12/2003 | Kawai |
| 6,763,254 | B2 | 7/2004 | Nishikawa |
| 6,812,707 | B2 | 11/2004 | Yonezawa et al. |
| 6,828,881 | B2 | 12/2004 | Mizutani et al. |
| 6,837,438 | B1 | 1/2005 | Takasugi et al. |
| 6,861,731 | B2 | 3/2005 | Buijsman et al. |
| 6,927,738 | B2 | 8/2005 | Senba et al. |
| 6,963,729 | B2 | 11/2005 | Uozumi |
| 7,088,249 | B2 | 8/2006 | Senba et al. |
| 7,088,307 | B2 | 8/2006 | Imaizumi |
| 7,112,952 | B2 | 9/2006 | Arai et al. |
| 7,119,693 | B1 | 10/2006 | Devilbiss |
| 7,129,834 | B2 | 10/2006 | Naruse et al. |
| 7,248,221 | B2 | 7/2007 | Kai et al. |
| 7,250,910 | B2 | 7/2007 | Yoshikawa et al. |
| 7,276,929 | B2 | 10/2007 | Arai et al. |
| 7,317,396 | B2 | 1/2008 | Ujino |
| 7,405,664 | B2 | 7/2008 | Sakama et al. |
| 2002/0011967 | A1 | 1/2002 | Goff et al. |
| 2002/0015002 | A1 | 2/2002 | Yasukawa et al. |
| 2002/0044092 | A1 | 4/2002 | Kushihi |
| 2002/0067316 | A1 | 6/2002 | Yokoshima et al. |
| 2002/0093457 | A1 | 7/2002 | Hamada et al. |
| 2003/0006901 | A1 | 1/2003 | Kim et al. |
| 2003/0020661 | A1 | 1/2003 | Sato |
| 2003/0045324 | A1 | 3/2003 | Nagumo et al. |
| 2003/0169153 | A1 | 9/2003 | Muller |
| 2004/0001027 | A1 | 1/2004 | Killen et al. |
| 2004/0026519 | A1 | 2/2004 | Usami et al. |
| 2004/0056823 | A1 | 3/2004 | Zuk et al. |
| 2004/0066617 | A1 | 4/2004 | Hirabayashi et al. |
| 2004/0217915 | A1 | 11/2004 | Imaizumi |
| 2004/0219956 | A1 | 11/2004 | Iwai et al. |
| 2004/0227673 | A1 | 11/2004 | Iwai et al. |
| 2004/0252064 | A1 | 12/2004 | Yuanzhu |
| 2005/0092836 | A1 | 5/2005 | Kudo |
| 2005/0099337 | A1 | 5/2005 | Takei et al. |
| 2005/0125093 | A1 | 6/2005 | Kikuchi et al. |
| 2005/0134460 | A1 | 6/2005 | Usami |
| 2005/0134506 | A1 | 6/2005 | Egbert |
| 2005/0138798 | A1 | 6/2005 | Sakama et al. |
| 2005/0140512 | A1 | 6/2005 | Sakama et al. |
| 2005/0232412 | A1 | 10/2005 | Ichihara et al. |
| 2005/0236623 | A1 | 10/2005 | Takechi et al. |
| 2005/0275539 | A1 | 12/2005 | Sakama et al. |
| 2006/0001138 | A1 | 1/2006 | Sakama et al. |
| 2006/0044192 | A1 | 3/2006 | Egbert |
| 2006/0055601 | A1 | 3/2006 | Kameda et al. |
| 2006/0071084 | A1 | 4/2006 | Detig et al. |
| 2006/0109185 | A1 | 5/2006 | Iwai et al. |
| 2006/0145872 | A1 | 7/2006 | Tanaka et al. |
| 2006/0158380 | A1 | 7/2006 | Son et al. |
| 2006/0170606 | A1 | 8/2006 | Yamagajo et al. |
| 2006/0214801 | A1 | 9/2006 | Murofushi et al. |
| 2006/0220871 | A1 | 10/2006 | Baba et al. |
| 2006/0244676 | A1 | 11/2006 | Uesaka |
| 2006/0267138 | A1 | 11/2006 | Kobayashi |
| 2007/0004028 | A1 | 1/2007 | Lair et al. |
| 2007/0018893 | A1 | 1/2007 | Kai et al. |
| 2007/0040028 | A1 | 2/2007 | Kawamata |
| 2007/0052613 | A1 | 3/2007 | Gallschuetz et al. |
| 2007/0057854 | A1 | 3/2007 | Oodachi et al. |
| 2007/0069037 | A1 | 3/2007 | Kawai |
| 2007/0132591 | A1 | 6/2007 | Khatri |
| 2007/0164414 | A1 | 7/2007 | Dokai et al. |
| 2007/0200782 | A1 | 8/2007 | Hayama et al. |
| 2007/0252700 | A1 | 11/2007 | Ishihara et al. |
| 2007/0252703 | A1 | 11/2007 | Kato et al. |
| 2007/0285335 | A1 | 12/2007 | Bungo et al. |
| 2007/0290928 | A1 | 12/2007 | Chang et al. |
| 2008/0024156 | A1 | 1/2008 | Arai et al. |
| 2008/0087990 | A1 | 4/2008 | Kato et al. |
| 2008/0169905 | A1 | 7/2008 | Slatter |
| 2008/0272885 | A1 | 11/2008 | Atherton |
| 2009/0002130 | A1 | 1/2009 | Kato |
| 2009/0009007 | A1 | 1/2009 | Kato et al. |
| 2009/0065594 | A1 | 3/2009 | Kato et al. |
| 2009/0109102 | A1 | 4/2009 | Dokai et al. |
| 2009/0160719 | A1 | 6/2009 | Kato et al. |
| 2009/0262041 | A1 | 10/2009 | Ikemoto et al. |

FOREIGN PATENT DOCUMENTS

| | | |
|---|---|---|
| EP | 0 694 874 A2 | 1/1996 |
| EP | 0 977 145 A2 | 2/2000 |
| EP | 1 010 543 A1 | 6/2000 |
| EP | 1 160 915 A2 | 12/2001 |
| EP | 1 170 795 A2 | 1/2002 |
| EP | 1 227 540 A1 | 7/2002 |
| EP | 1 280 232 A1 | 1/2003 |
| EP | 1 280 350 A1 | 1/2003 |
| EP | 1 343 223 A1 | 9/2003 |
| EP | 1 357 511 A2 | 10/2003 |
| EP | 1 548 872 A1 | 6/2005 |
| EP | 1 703 589 A1 | 9/2006 |
| EP | 1 841 005 A1 | 10/2007 |
| EP | 2 009 738 A1 | 12/2008 |
| EP | 2 148 449 A1 | 1/2010 |
| GB | 2 305 075 A | 3/1997 |
| JP | 50-143451 A | 11/1975 |
| JP | 62-127140 U | 8/1987 |
| JP | 02-164105 A | 6/1990 |
| JP | 03-262313 A | 11/1991 |
| JP | 04-150011 A | 5/1992 |
| JP | 04-167500 A | 6/1992 |
| JP | 05-327331 A | 12/1993 |
| JP | 6-53733 A | 2/1994 |
| JP | 06-077729 A | 3/1994 |
| JP | 06-177635 A | 6/1994 |
| JP | 6-260949 A | 9/1994 |
| JP | 07-183836 A | 7/1995 |
| JP | 08-056113 A | 2/1996 |
| JP | 8-87580 A | 4/1996 |
| JP | 08-088586 A | 4/1996 |
| JP | 11-149537 A | 6/1996 |
| JP | 08-176421 A | 7/1996 |
| JP | 08-180160 A | 7/1996 |
| JP | 08-279027 A | 10/1996 |
| JP | 08-307126 A | 11/1996 |
| JP | 08-330372 A | 12/1996 |
| JP | 09-014150 A | 1/1997 |
| JP | 09-035025 A | 2/1997 |
| JP | 9-93029 A | 4/1997 |
| JP | 09-245381 A | 9/1997 |
| JP | 09-252217 A | 9/1997 |
| JP | 09-270623 A | 10/1997 |
| JP | 9-512367 A | 12/1997 |
| JP | 10-069533 A | 3/1998 |
| JP | 10-505466 A | 5/1998 |
| JP | 10-171954 A | 6/1998 |
| JP | 10-193849 A | 7/1998 |
| JP | 10-193851 A | 7/1998 |
| JP | 10193851 A * | 7/1998 |
| JP | 10-293828 A | 11/1998 |
| JP | 11-039441 A | 2/1999 |
| JP | 11-075329 A | 3/1999 |
| JP | 11-085937 A | 3/1999 |
| JP | 11-102424 A | 4/1999 |
| JP | 11-103209 A | 4/1999 |
| JP | 11-149536 A | 6/1999 |

| | | | | | | |
|---|---|---|---|---|---|---|
| JP | 11-149538 A | 6/1999 | | JP | 2002-374139 A | 12/2002 |
| JP | 11-219420 A | 8/1999 | | JP | 2003-006599 A | 1/2003 |
| JP | 11-220319 A | 8/1999 | | JP | 2003-016412 A | 1/2003 |
| JP | 11-328352 A | 11/1999 | | JP | 2003-026177 A | 1/2003 |
| JP | 11-346114 A | 12/1999 | | JP | 2003-030612 A | 1/2003 |
| JP | 11-515094 A | 12/1999 | | JP | 2003-44789 A | 2/2003 |
| JP | 2000-21128 A | 1/2000 | | JP | 2003-046318 A | 2/2003 |
| JP | 2000-021639 A | 1/2000 | | JP | 2003-58840 A | 2/2003 |
| JP | 2000-022421 A | 1/2000 | | JP | 2003-067711 A | 3/2003 |
| JP | 2005-229474 A | 1/2000 | | JP | 2003-069335 A | 3/2003 |
| JP | 2000-059260 A | 2/2000 | | JP | 2003-076947 A | 3/2003 |
| JP | 2000-085283 A | 3/2000 | | JP | 2003-76963 A | 3/2003 |
| JP | 2000-090207 A | 3/2000 | | JP | 2003-78333 A | 3/2003 |
| JP | 2000-132643 A | 5/2000 | | JP | 2003-078336 A | 3/2003 |
| JP | 2000-137778 A | 5/2000 | | JP | 2003-085501 A | 3/2003 |
| JP | 2000-137779 A | 5/2000 | | JP | 2003-085520 A | 3/2003 |
| JP | 2000-137785 A | 5/2000 | | JP | 2003-87008 A | 3/2003 |
| JP | 2000-148948 A | 5/2000 | | JP | 2003-87044 A | 3/2003 |
| JP | 2000-172812 A | 6/2000 | | JP | 2003-099720 A | 4/2003 |
| JP | 2000-209013 A | 7/2000 | | JP | 2003-099721 A | 4/2003 |
| JP | 2000-222540 A | 8/2000 | | JP | 2003-110344 A | 4/2003 |
| JP | 2000-510271 A | 8/2000 | | JP | 2003-132330 A | 5/2003 |
| JP | 2000-243797 A | 9/2000 | | JP | 2003-134007 A | 5/2003 |
| JP | 2000-251049 A | 9/2000 | | JP | 2003-155062 A | 5/2003 |
| JP | 2000-261230 A | 9/2000 | | JP | 2003-158414 A | 5/2003 |
| JP | 2000-276569 A | 10/2000 | | JP | 2003-168760 A | 6/2003 |
| JP | 2000-286634 A | 10/2000 | | JP | 2003-179565 A | 6/2003 |
| JP | 2000-286760 A | 10/2000 | | JP | 2003-187207 A | 7/2003 |
| JP | 2000-311226 A | 11/2000 | | JP | 2003-187211 A | 7/2003 |
| JP | 2000-321984 A | 11/2000 | | JP | 2003-188338 A | 7/2003 |
| JP | 3075400 U | 11/2000 | | JP | 2003-188620 A | 7/2003 |
| JP | 2000-349680 A | 12/2000 | | JP | 2003-198230 A | 7/2003 |
| JP | 2001-10264 A | 1/2001 | | JP | 2003-209421 A | 7/2003 |
| JP | 2001-028036 A | 1/2001 | | JP | 2003-216919 A | 7/2003 |
| JP | 2007-18067 A | 1/2001 | | JP | 2003-218624 A | 7/2003 |
| JP | 2001-043340 A | 2/2001 | | JP | 2003-233780 A | 8/2003 |
| JP | 2001-66990 A | 3/2001 | | JP | 2003-242471 A | 8/2003 |
| JP | 2001-505682 A | 4/2001 | | JP | 2003-243918 A | 8/2003 |
| JP | 2001-168628 A | 6/2001 | | JP | 2003-249813 A | 9/2003 |
| JP | 2001-188890 A | 7/2001 | | JP | 2003-529163 A | 9/2003 |
| JP | 2001-240046 A | 9/2001 | | JP | 2003-288560 A | 10/2003 |
| JP | 2001-256457 A | 9/2001 | | JP | 2003-309418 A | 10/2003 |
| JP | 2001-257292 A | 9/2001 | | JP | 2003-317060 A | 11/2003 |
| JP | 2001-514777 A | 9/2001 | | JP | 2003-331246 A | 11/2003 |
| JP | 2001-319380 A | 11/2001 | | JP | 2003-332820 A | 11/2003 |
| JP | 2001-331976 A | 11/2001 | | JP | 2004-040597 A | 2/2004 |
| JP | 2001-332923 A | 11/2001 | | JP | 2004-505481 A | 2/2004 |
| JP | 2001-339226 A | 12/2001 | | JP | 2004-082775 A | 3/2004 |
| JP | 2001-344574 A | 12/2001 | | JP | 2004-88218 A | 3/2004 |
| JP | 2001-351084 A | 12/2001 | | JP | 2004-93693 A | 3/2004 |
| JP | 2001-352176 A | 12/2001 | | JP | 2004-096566 A | 3/2004 |
| JP | 2002-024776 A | 1/2002 | | JP | 2004-127230 A | 4/2004 |
| JP | 2002-026513 A | 1/2002 | | JP | 2004-519916 A | 7/2004 |
| JP | 2002-042076 A | 2/2002 | | JP | 2004-234595 A | 8/2004 |
| JP | 2002-063557 A | 2/2002 | | JP | 2004-253858 A | 9/2004 |
| JP | 2002-505645 A | 2/2002 | | JP | 2004-527864 A | 9/2004 |
| JP | 2002-076750 A | 3/2002 | | JP | 2004-280390 A | 10/2004 |
| JP | 2002-76750 A | 3/2002 | | JP | 2004-287767 A | 10/2004 |
| JP | 2002-150245 A | 5/2002 | | JP | 2004-297249 A | 10/2004 |
| JP | 2002-157564 A | 5/2002 | | JP | 2004-297681 A | 10/2004 |
| JP | 2002-158529 A | 5/2002 | | JP | 2004-319848 A | 11/2004 |
| JP | 2002-175508 A | 6/2002 | | JP | 2004-326380 A | 11/2004 |
| JP | 2002-183690 A | 6/2002 | | JP | 2004-334268 A | 11/2004 |
| JP | 2002-185358 A | 6/2002 | | JP | 2004-336250 A | 11/2004 |
| JP | 2002-204117 A | 7/2002 | | JP | 2004-343000 A | 12/2004 |
| JP | 2002-522849 A | 7/2002 | | JP | 2004-362190 A | 12/2004 |
| JP | 2002-230128 A | 8/2002 | | JP | 2004-362341 A | 12/2004 |
| JP | 2002-232221 A | 8/2002 | | JP | 2004-362602 A | 12/2004 |
| JP | 2002-252117 A | 9/2002 | | JP | 2005-5866 A | 1/2005 |
| JP | 2002-259934 A | 9/2002 | | JP | 2005-18156 A | 1/2005 |
| JP | 2002-280821 A | 9/2002 | | JP | 2005-124061 A | 5/2005 |
| JP | 2002-298109 A | 10/2002 | | JP | 2005-128592 A | 5/2005 |
| JP | 2002-308437 A | 10/2002 | | JP | 2005-129019 A | 5/2005 |
| JP | 2002-319008 A | 10/2002 | | JP | 2005-136528 A | 5/2005 |
| JP | 2002-319009 A | 10/2002 | | JP | 2005-137032 A | 5/2005 |
| JP | 2002-319812 A | 10/2002 | | JP | 3653099 B2 | 5/2005 |
| JP | 2002-362613 A | 12/2002 | | JP | 2005-165839 A | 6/2005 |
| JP | 2002-373029 A | 12/2002 | | JP | 2005-167327 A | 6/2005 |
| JP | 2002-373323 A | 12/2002 | | JP | 2005-167813 A | 6/2005 |

| | | |
|---|---|---|
| JP | 2005-190417 A | 7/2005 |
| JP | 2005-191705 A | 7/2005 |
| JP | 2005-210676 A | 8/2005 |
| JP | 2005-210680 A | 8/2005 |
| JP | 2005-217822 A | 8/2005 |
| JP | 2005-236339 A | 9/2005 |
| JP | 2005-244778 A | 9/2005 |
| JP | 2005-275870 A | 10/2005 |
| JP | 2005-284352 A | 10/2005 |
| JP | 2005-293537 A | 10/2005 |
| JP | 2005-295135 A | 10/2005 |
| JP | 2005-311205 A | 11/2005 |
| JP | 2005-321305 A | 11/2005 |
| JP | 2005-322119 A | 11/2005 |
| JP | 2005-335755 A | 12/2005 |
| JP | 2005-345802 A | 12/2005 |
| JP | 2005-346820 A | 12/2005 |
| JP | 2005-352858 A | 12/2005 |
| JP | 2006-025390 A | 1/2006 |
| JP | 2006-031766 A | 2/2006 |
| JP | 2006-39902 A | 2/2006 |
| JP | 2006-42059 A | 2/2006 |
| JP | 2006-42097 A | 2/2006 |
| JP | 2006042097 A * | 2/2006 |
| JP | 2006-67479 A | 3/2006 |
| JP | 2006-72706 A | 3/2006 |
| JP | 2006-80367 A | 3/2006 |
| JP | 2006-92630 A | 4/2006 |
| JP | 2006-102953 A | 4/2006 |
| JP | 2006-107296 A | 4/2006 |
| JP | 2006-513594 A | 4/2006 |
| JP | 2006-148518 A | 6/2006 |
| JP | 2006-151402 A | 6/2006 |
| JP | 2006-174151 A | 6/2006 |
| JP | 2006-195795 A | 7/2006 |
| JP | 2006-203187 A | 8/2006 |
| JP | 2006-203852 A | 8/2006 |
| JP | 2006-217000 A | 8/2006 |
| JP | 2006-232292 A | 9/2006 |
| JP | 2006-237674 A | 9/2006 |
| JP | 2006-270212 A | 10/2006 |
| JP | 2006-270766 A | 10/2006 |
| JP | 2006-285911 A | 10/2006 |
| JP | 2006-295879 A | 10/2006 |
| JP | 2006-302219 A | 11/2006 |
| JP | 2006-309401 A | 11/2006 |
| JP | 2006-311239 A | 11/2006 |
| JP | 2006-323481 A | 11/2006 |
| JP | 2007-007888 A | 1/2007 |
| JP | 2007-13120 A | 1/2007 |
| JP | 2007-043535 A | 2/2007 |
| JP | 2007-048126 A | 2/2007 |
| JP | 2007-65822 A | 3/2007 |
| JP | 2007-79687 A | 3/2007 |
| JP | 2007-81712 A | 3/2007 |
| JP | 2007-096768 A | 4/2007 |
| JP | 2007-102348 A | 4/2007 |
| JP | 2007-122542 A | 5/2007 |
| JP | 2007-150642 A | 6/2007 |
| JP | 2007-150868 A | 6/2007 |
| JP | 2007-159083 A | 6/2007 |
| JP | 2007-159129 A | 6/2007 |
| JP | 2007-228325 A | 9/2007 |
| JP | 2007-266999 A | 10/2007 |
| JP | 2007-312350 A | 11/2007 |
| JP | 2008-72243 A | 3/2008 |
| JP | 4069958 B2 | 4/2008 |
| JP | 2008-160874 A | 7/2008 |
| JP | 11-175678 A | 1/2009 |
| JP | 2009-25870 A | 2/2009 |
| JP | 2009-27291 A | 2/2009 |
| NL | 9100176 A | 3/1992 |
| NL | 9100347 A | 3/1992 |
| WO | 99/67754 A1 | 12/1999 |
| WO | 00/10122 A2 | 2/2000 |
| WO | 02/061675 A1 | 8/2002 |
| WO | 02/097723 A1 | 12/2002 |
| WO | 03/079305 A1 | 9/2003 |
| WO | 2004/036772 A1 | 4/2004 |
| WO | 2004/070879 A | 8/2004 |
| WO | 2004/072892 A1 | 8/2004 |
| WO | 2005/073937 A | 8/2005 |
| WO | 2005/115849 A1 | 12/2005 |
| WO | 2006/045682 A | 5/2006 |
| WO | 2007/083574 A1 | 7/2007 |
| WO | 2007/083575 A1 | 7/2007 |
| WO | 2007/119310 A1 | 10/2007 |
| WO | 2007/125683 A1 | 11/2007 |
| WO | 2007/138857 A1 | 12/2007 |
| WO | 2008/007606 A | 1/2008 |
| WO | 2008/140037 A1 | 11/2008 |
| WO | 2009/011376 A1 | 1/2009 |
| WO | 2009/081719 A1 | 7/2009 |

OTHER PUBLICATIONS

Official communication issued in Japanese Application No. 2007-531525, mailed on Sep. 25, 2007.
Official communication issued in Japanese Application No. 2007-531524, mailed on Dec. 12, 2007.
Official communication issued in European Application No. 07706650.4, mailed on Nov. 24, 2008.
Mukku-Sha, "Musen IC Tagu Katsuyo-no Subete" "(All About Wireless IC Tags"), RFID, pp. 112-126.
Dokai et al.: "Wireless IC Device and Component for Wireless IC Device"; U.S. Appl. No. 11/624,382, filed Jan. 18, 2007.
Dokai et al.: "Wireless IC Device, and Component for Wireless IC Device"; U.S. Appl. No. 11/930,818, filed Oct. 31, 2007.
Kato et al.: "Wireless IC Device"; U.S. Appl. No. 12/042,399, filed Mar. 5, 2008.
Official communication issued in related U.S. Appl. No. 12/042,399; mailed on Aug. 25, 2008.
English translation of NL9100176, published on Mar. 2, 1992.
English translation of NL9100347, published on Mar. 2, 1992.
Kato et al.: "Antenna"; U.S. Appl. No. 11/928,502, filed Oct. 30, 2007.
Kato et al.: "Wireless IC Device"; U.S. Appl. No. 12/211,117, filed Sep. 16, 2008.
Kato et al.: "Antenna"; U.S. Appl. No. 11/688,290, filed Mar. 20, 2007.
Kato et al.: "Electromagnetic-Coupling-Module-Attached Article"; U.S. Appl. No. 11/740,509, filed Apr. 26, 2007.
Kato et al.: "Product Including Power Supply Circuit Board"; U.S. Appl. No. 12/234,949, filed Sep. 22, 2008.
Kato et al.: "Data Coupler"; U.S. Appl. No. 12/252,475, filed Oct. 16, 2008.
Kato et al.; "Information Terminal Device"; U.S. Appl. No. 12/267,666, filed Nov. 10, 2008.
Kato et al.: "Wireless IC Device and Wireless IC Device Composite Component"; U.S. Appl. No. 12/276,444, filed Nov. 24, 2008.
Dokai et al.: "Optical Disc"; U.S. Appl. No. 12/326,916, filed Dec. 3, 2008.
Dokai et al.: "System for Inspecting Electromagnetic Coupling Modules and Radio IC Devices and Method for Manufacturing Electromagnetic Coupling Modules and Radio IC Devices Using the System"; U.S. Appl. No. 12/274,400, filed Nov. 20, 2008.
Kato: "Wireless IC Device"; U.S. Appl. No. 11/964,185, filed Dec. 26, 2007.
Kato et al.: "Radio Frequency IC Device"; U.S. Appl. No. 12/336,629, filed Dec. 17, 2008.
Kato et al.: "Wireless IC Device and Component for Wireless IC Device"; U.S. Appl. No. 12/339,198, filed Dec. 19, 2008.
Ikemoto et al.: "Wireless IC Device"; U.S. Appl. No. 11/851,651, filed Sep. 7, 2007.
Kataya et al.: "Wireless IC Device and Electronic Device"; U.S. Appl. No. 11/851,661, filed Sep. 7, 2007.
Dokai et al.: "Antenna and Radio IC Device"; U.S. Appl. No. 12/350,307, filed Jan. 8, 2009.
Official communication issued in counterpart International Application No. PCT/JP2008/071502, mailed Feb. 24, 2009.
Kato et al.: "Wireless IC Device and Manufacturing Method Thereof," U.S. Appl. No. 12/432,854, filed Apr. 30, 2009.

Official communication issued in counterpart International Application No. PCT/JP2008/058168, mailed Aug. 12, 2008.
Official communication issued in counterpart International Application No. PCT/JP2008/062886, mailed Oct. 21, 2008.
Kato et al.: "Wireless IC Device," U.S. Appl. No. 12/469,896, filed May 21, 2009.
Ikemoto et al.: "Wireless IC Device," U.S. Appl. No. 12/496,709, filed Jul. 2, 2009.
Official communication issued in counterpart International Application No. PCT/JP2008/062947, mailed Aug. 19, 2008.
Official communication issued in counterpart International Application No. PCT/JP2008/056026, mailed Jul. 1, 2008.
Ikemoto et al.: "Wireless IC Device and Electronic Apparatus," U.S. Appl. No. 12/503,188, filed Jul. 15, 2009.
Official communication issued in counterpart International Application No. PCT/JP2008/055567, mailed May 20, 2008.
Official communication issued in counterpart International Application No. PCT/JP2008/051853, mailed Apr. 22, 2008.
Official communication issued in counterpart International Application No. PCT/JP2008/057239, mailed Jul. 22, 2008.
Kimura et al.: "Wireless IC Device," U.S. Appl. No. 12/510,338, filed Jul. 28, 2009.
Kato et al.: "Wireless IC Device," U.S. Appl. No. 12/510,340, filed Jul. 28, 2009.
Kato: "Wireless IC Device," U.S. Appl. No. 12/510,344, filed Jul. 28, 2009.
Kato et al.: "Wireless IC Device," U.S. Appl. No. 12/510,347, filed Jul. 28, 2009.
Official Communication issued in International Application No. PCT/JP2007/066007, mailed on Nov. 27, 2007.
Dokai et al.: "Wireless IC Device and Component for Wireless IC Device"; U.S. Appl. No. 12/359,690, filed Jan. 26, 2009.
Dokai et al.: "Test System for Radio Frequency IC Devices and Method of Manufacturing Radio Frequency IC Devices Using the Same"; U.S. Appl. No. 12/388,826, filed Feb. 19, 2009.
Official Communication issued in International Application No. PCT/JP2008/061955, mailed on Sep. 30, 2008.
Official Communication issued in International Application No. PCT/JP2007/066721, mailed on Nov. 27, 2007.
Official Communication issued in International Application No. PCT/JP2007/070460, mailed on Dec. 11, 2007.
Kato et al.: "Wireless IC Device"; U.S. Appl. No. 12/390,556, filed Feb. 23, 2009.
Kato et al.: "Inductively Coupled Module and Item With Inductively Coupled Module"; U.S. Appl. No. 12/398,497, filed Mar. 5, 2009.
Official Communication issued in International Patent Application No. PCT/JP2008/050945, mailed on May 1, 2008.
Kato et al.: "Article Having Electromagnetic Coupling Module Attached Thereto"; U.S. Appl. No. 12/401,767, filed Mar. 11, 2009.
Taniguchi et al.: "Antenna Device and Radio Frequency IC Device"; U.S. Appl. No. 12/326,117, filed Dec. 2, 2008.
Official Communication issued in International Patent Application No. PCT/JP2008/061442, mailed on Jul. 22, 2008.
Kato et al.: "Container With Electromagnetic Coupling Module"; U.S. Appl. No. 12/426,369, filed Apr. 20, 2009.
Kato: "Wireless IC Device"; U.S. Appl. No. 12/429,346, filed Apr. 24, 2009.
Official Communication issued in International Patent Application No. PCT/JP2008/063025, mailed on Aug. 12, 2008.
Kato et al.: "Wireless IC Device," U.S. Appl. No. 12/603,608, filed Oct. 22, 2009.
Kato et al.: "Wireless IC Device," U.S. Appl. No. 12/688,072, filed Jan. 15, 2010.
Official Communication issued in International Patent Application No. PCT/JP2009/053693, mailed on Jun. 9, 2009.
Kato: "Composite Antenna," U.S. Appl. No. 12/845,846, filed Jul. 29, 2010.
Official Communication issued in International Patent Application No. PCT/JP2009/053690, mailed on Jun. 2, 2009.
Kato et al.: "Radio Frequency IC Device and Radio Communication System," U.S. Appl. No. 12/859,340, filed Aug. 19, 2010.
Official Communication issued in International Patent Application No. PCT/JP2009/055758, mailed on Jun. 23, 2009.
Kato et al.: "Wireless IC Device," U.S. Appl. No. 12/859,880, filed Aug. 20, 2010.
Official Communication issued in International Patent Application No. PCT/JP2009/057482, mailed on Jul. 21, 2009.
Kataya et al.: "Wireless IC Device, Electronic Apparatus, and Method for Adjusting Resonant Frequency of Wireless IC Device," U.S. Appl. No. 12/861,945, filed Aug. 24, 2010.
Kato: "Wireless IC Device and Electromagnetic Coupling Module," U.S. Appl. No. 12/890,895, filed Sep. 27, 2010.
Official Communication issued in International Patent Application No. PCT/JP2009/059410, mailed on Aug. 4, 2009.
Kato et al.: "Wireless IC Device" U.S. Appl. No. 12/902,174, filed Oct. 12, 2010.
Official Communication issued in International Patent Application No. PCT/JP2009/059259, mailed on Aug. 11, 2009.
Official Communication issued in corresponding Japanese Patent Application No. 2010-506742, mailed on Apr. 6, 2010.
Official Communication issued in International Patent Application No. PCT/JP2009/056698, mailed on Jul. 7, 2009.
Official Communication issued in International Patent Application No. PCT/JP2009/056934, mailed on Jun. 30, 2009.
Kato et al.: "Wireless IC Device" U.S. Appl. No. 12/903,242, filed Nov. 5, 2010.
Kato et al.: "Wireless IC Device," U.S. Appl. No. 12/940,105, filed Nov. 5, 2010.
Official communication issued in counterpart European Application No. 08 77 7758, dated on Jun. 30, 2009.
Official communication issued in counterpart Japanese Application No. 2008-103741, mailed on May 26, 2009.
Official communication issued in counterpart Japanese Application No. 2008-103742, mailed on May 26, 2009.
Official communication issued in International Application No. PCT/JP2008/050358, mailed on Mar. 25, 2008.
Official communication issued in International Application No. PCT/JP2008/050356, mailed on Mar. 25, 2008.
Osamura et al.: "Packaging Material With Electromagnetic Coupling Module," U.S. Appl. No. 12/536,663, filed Aug. 6, 2009.
Osamura et al.: "Packaging Material With Electromagnetic Coupling Module," U.S. Appl. No. 12/536,669, filed Aug. 6, 2009.
Dokai et al.: "Wireless IC Device and Component for Wireless IC Device," U.S. Appl. No. 12/543,553, filed Aug. 19, 2009.
Shioya et al.: "Wireless IC Device," U.S. Appl. No. 12/551,037, filed Aug. 31, 2009.
Ikemoto: "Wireless IC Device and Manufacturing Method Thereof," U.S. Appl. No. 12/579,672, filed Oct. 15, 2009.
Official communication issued in International Application No. PCT/JP2008/058614, mailed on Jun. 10, 2008.

* cited by examiner

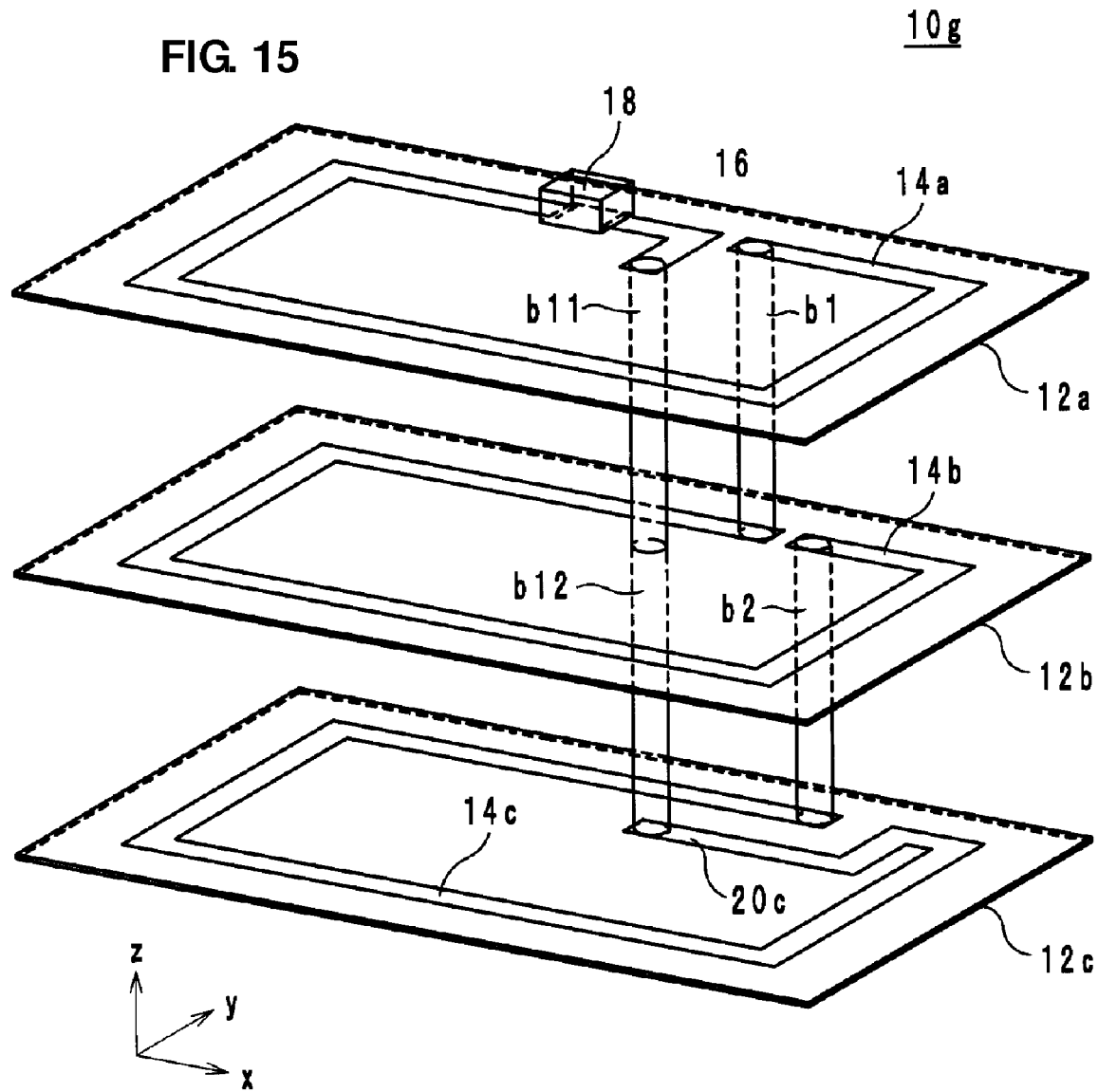

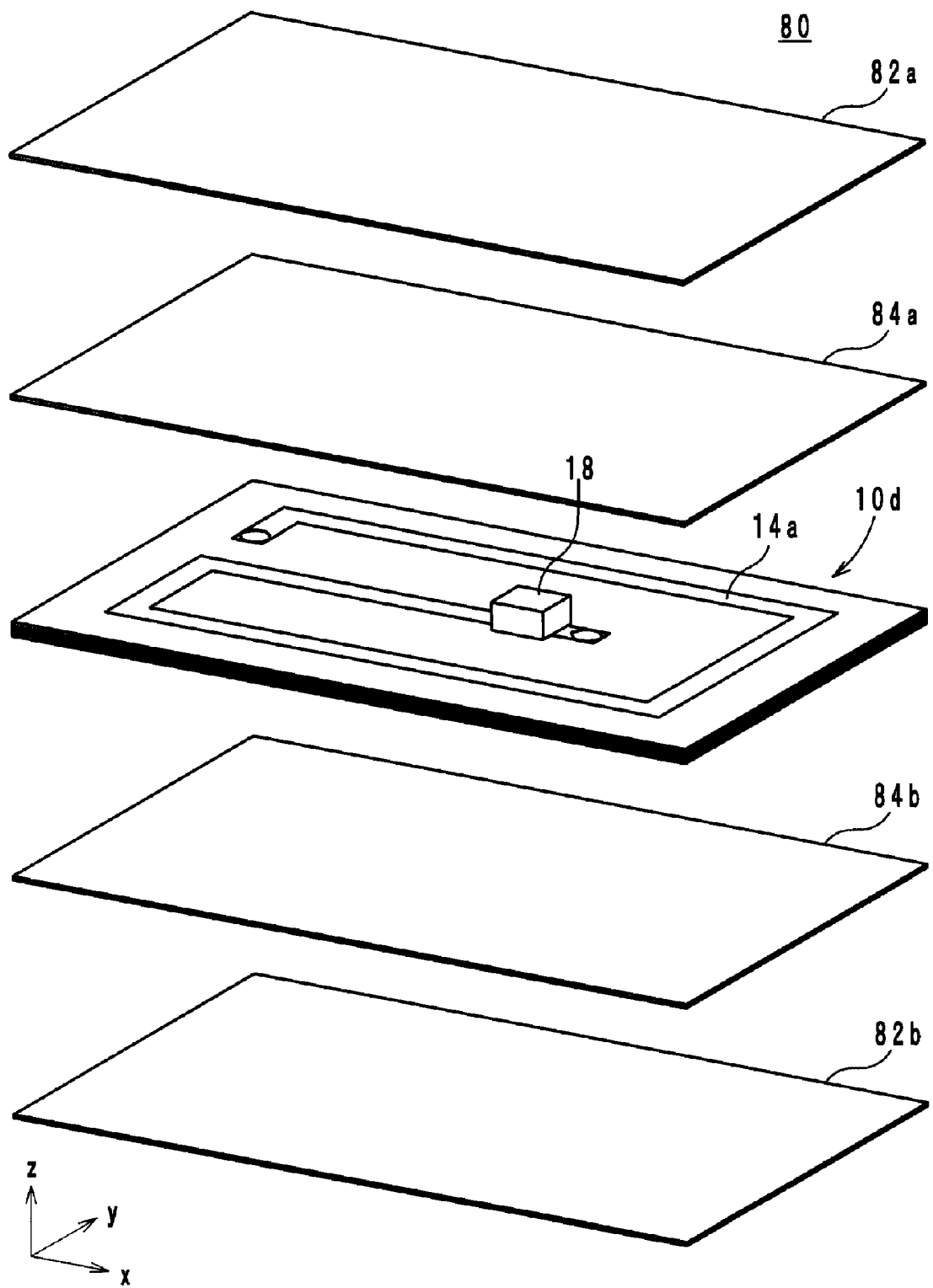

WIRELESS IC DEVICE AND METHOD OF MANUFACTURING THE SAME

BACKGROUND OF THE INVENTION

1. Field of the Invention

The present invention relates to a wireless integrated circuit (IC) device and to a method of manufacturing the wireless IC device. More specifically, the present invention relates to a wireless IC device including a wireless IC that is used in radio frequency identification (RFID) systems and to a method of manufacturing the wireless IC device.

2. Description of the Related Art

A non-contact IC card described in Japanese Unexamined Patent Application Publication No. 2001-10264 is an example of a known wireless IC devices used for access management, commuter passes, credit cards and other applications. FIG. 19A is a top surface view of a non-contact IC card 100 described in Japanese Unexamined Patent Application Publication No. 2001-10264 and FIG. 19B is bottom surface view of the non-contact IC card 100 described in Japanese Unexamined Patent Application Publication No. 2001-10264.

In the non-contact IC card 100 illustrated in FIGS. 19A and 19B, an antenna coil 104, which winds in a spiral shape a plurality of times, is arranged on a main surface of a substrate 102, and an adjustment resistor (not illustrated in FIGS. 19A and 19B) and an adjustment capacitor 108 are connected to the antenna coil 104. Furthermore, an IC 106 is connected to the antenna coil 104. In this non-contact IC card, by trimming a portion of the adjustment resistor and the adjustment capacitor 108 during manufacturing, the resistance value and the capacitance value of the non-contact IC card 100 can be adjusted and the resonant frequency and sharpness (Q) can be adjusted.

However, with the non-contact IC card 100, as will be described below with reference to the drawings, the inventors of the present invention discovered that the resonant frequency varies during use. FIG. 20A is a sectional structural view of the antenna coil and the substrate of the non-contact IC card 100 taken along line B-B and FIG. 20B is an equivalent circuit diagram of the non-contact IC card 100. The substrate 102 and the antenna coil 104 are illustrated in FIG. 20A. In addition, in FIG. 20B, an inductance L100 of the antenna coil 104, a resistance R100 of the IC 106 and a capacitance C100 of the antenna coil 104 are illustrated.

In the non-contact IC card 100, the antenna coil 104 winds a plurality of times in a spiral shape on the main surface of the substrate 102. In the non-contact IC card 100, as illustrated in FIG. 20A, the wires that define the antenna coil 104 are arranged side by side and close to each other on the main surface. When a current flows through the wires arranged close to one another, due to the potential difference between the wires, electric force lines E100 are generated that link the wires, as illustrated by the arrows in FIG. 20B, and the capacitance C100 is generated between the wires. The capacitance C100, as illustrated in FIG. 20B, is connected in parallel with and between the inductance L100 and the resistance R100. Furthermore, in the non-contact IC card 100, the shape of the antenna coil 104 is designed so that desired values of the inductance L100 and the capacitance C100 are obtained that result in a desired resonant frequency.

However, even when the shape of the antenna coil 104 is designed so that the desired resonant frequency can be obtained, the inventors of the present invention discovered that the resonant frequency of the non-contact IC card 100 varies during use. Consequently, the inventors of the present invention performed experiments and computer simulations and investigated the cause of the variations of the resonant frequency of the non-contact IC card 100. As a result, the occurrence of a phenomenon described below in the non-contact IC card 100 was determined to be the cause of the variations of the resonant frequency.

The non-contact IC card 100 is used, for example, for access management or as a commuter pass or a credit card. This type of non-contact IC card 100 is usually used by being moved close to a dedicated reader/writer while being held in a person's hand. Therefore, as illustrated in FIG. 20A, during use, the person's finger is located in the vicinity of the antenna coil 104 and the electric force lines E100 pass through the person's finger. Since the dielectric constant of a person's finger is much greater than that of air, when the person's finger is moved close to the space between the wires of the antenna coil 104, the capacitance C100 generated between the wires of the antenna coil 104 is increased. As a result, the resonant frequency of the non-contact IC card 100 is reduced to less than the desired resonant frequency.

The manner in which the non-contact IC card 100 is held often differs during use, and therefore, the positional relationship between the wires of the antenna coil 104 and the person's hand is not fixed. Accordingly, the amount by which the capacitance C100 increases also varies during use and the amount by which the resonant frequency of the non-contact IC card 100 decreases also varies during use. In other words, the resonant frequency of the non-contact IC card 100 varies during use. Since the resonant frequency of the non-contact IC card 100 varies during use, the desired resonant frequency cannot be obtained by trimming an adjustment capacitor during manufacturing to adjust the resonant frequency.

SUMMARY OF THE INVENTION

To overcome the problems described above, preferred embodiments of the present invention provide a wireless IC device in which variations of the resonant frequency during use are prevented and a method of manufacturing the wireless IC device.

A wireless IC device according to a preferred embodiment of the present invention, includes an insulating sheet and a plurality of coil electrodes that define an antenna coil by being arranged so as to sandwich the insulating sheet therebetween and to be connected to one another, the plurality of coil electrodes being superposed with one another so as to define a single ring when viewed in plan from a direction perpendicular to a direction in which the main surface the insulating sheet extends.

A method of manufacturing the wireless IC device according to a preferred embodiment of the present invention includes a step of forming coil electrodes on a plurality of insulating sheets and a step of stacking the plurality of insulating sheets on top of one another so that the plurality of coil electrodes are superposed with one another so as to form a single ring when viewed in plan from a direction perpendicular to a direction in which the main surface the insulating sheet extends.

With the wireless IC device according to a preferred embodiment of the present invention and the method of manufacturing the wireless IC device according to a preferred embodiment of the present invention, the plurality of coil electrodes are superposed with one another so as to define a single ring when viewed in plan from a direction perpendicular to a direction in which the main surface the insulating sheet extends. Therefore, in the wireless IC device, the coil electrodes are not arranged side by side with one another such that the coil electrodes are close to each other in a direction in which the main surface of an insulating sheet extends. Consequently, leaking of the electric force lines generated between the coil electrodes to outside the wireless IC device is prevented. As a result, variations of the resonant frequency of the wireless IC device due to changes of the capacitance generated in the coil electrodes due to the manner in which the wireless IC device is held are greatly reduced.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 15 is an exploded perspective view of a wireless IC device according to a seventh preferred embodiment of the present invention.

FIG. 18 is an exploded perspective view of a wireless IC card.

DETAILED DESCRIPTION OF THE PREFERRED EMBODIMENTS

Wireless IC devices and a method of manufacturing the wireless IC devices according to preferred embodiments of the present invention will be described with reference to the drawings. In each of the drawings, common components and portions are denoted by the same reference symbols and repeated description thereof is omitted.

First Preferred Embodiment

Figure 1:
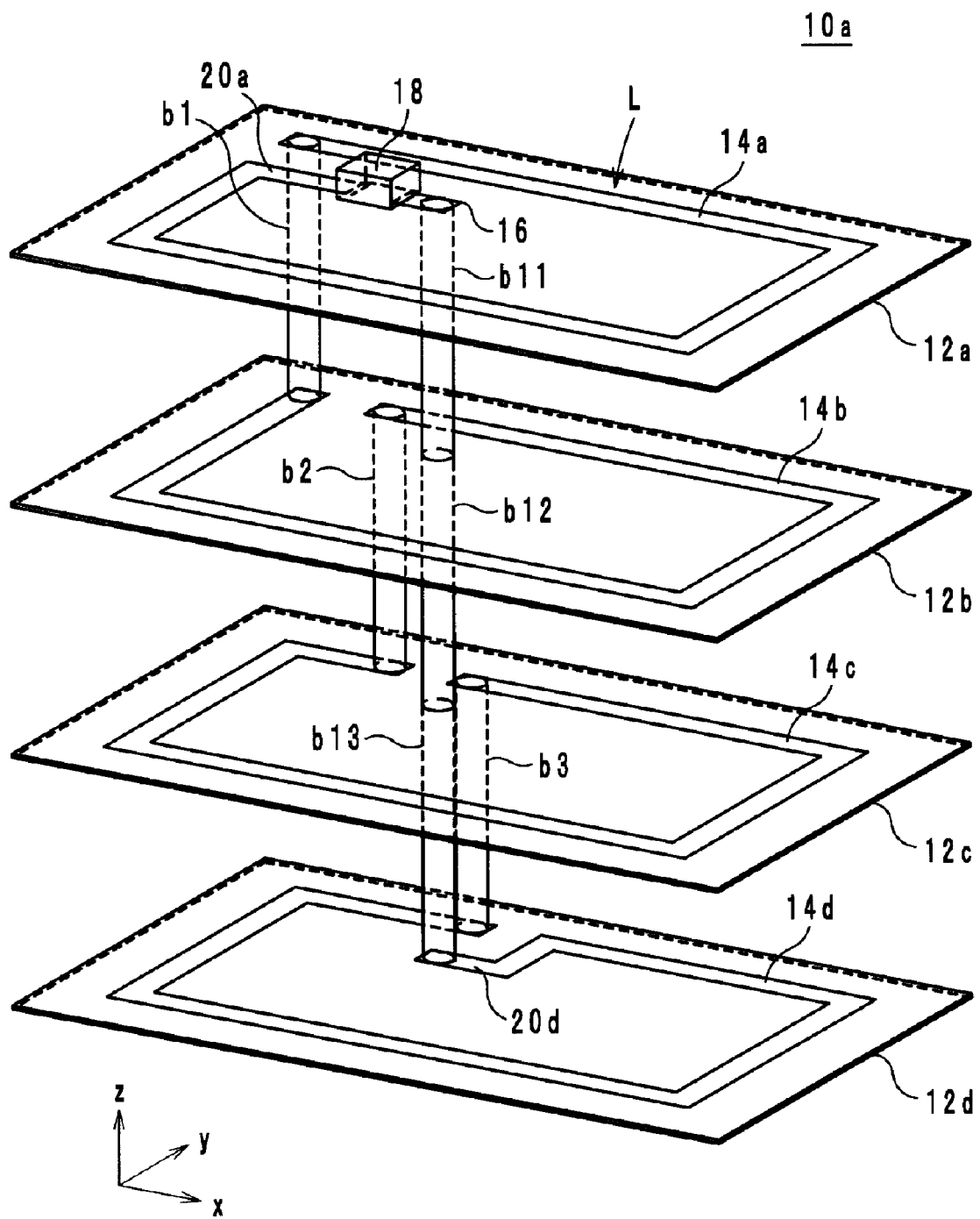
FIG. 1 is an exploded perspective view of a wireless IC device according to a first preferred embodiment of the present invention.
Figure 2A:
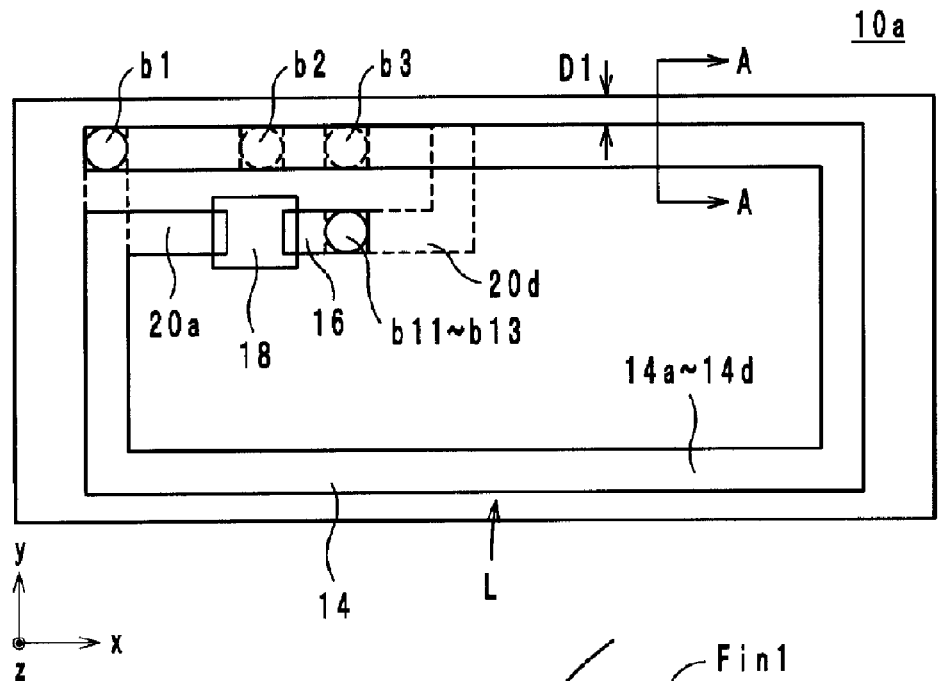
FIG. 2A shows the wireless IC device of FIG. 1 viewed in plan from a z-axis direction.
Figure 2B:
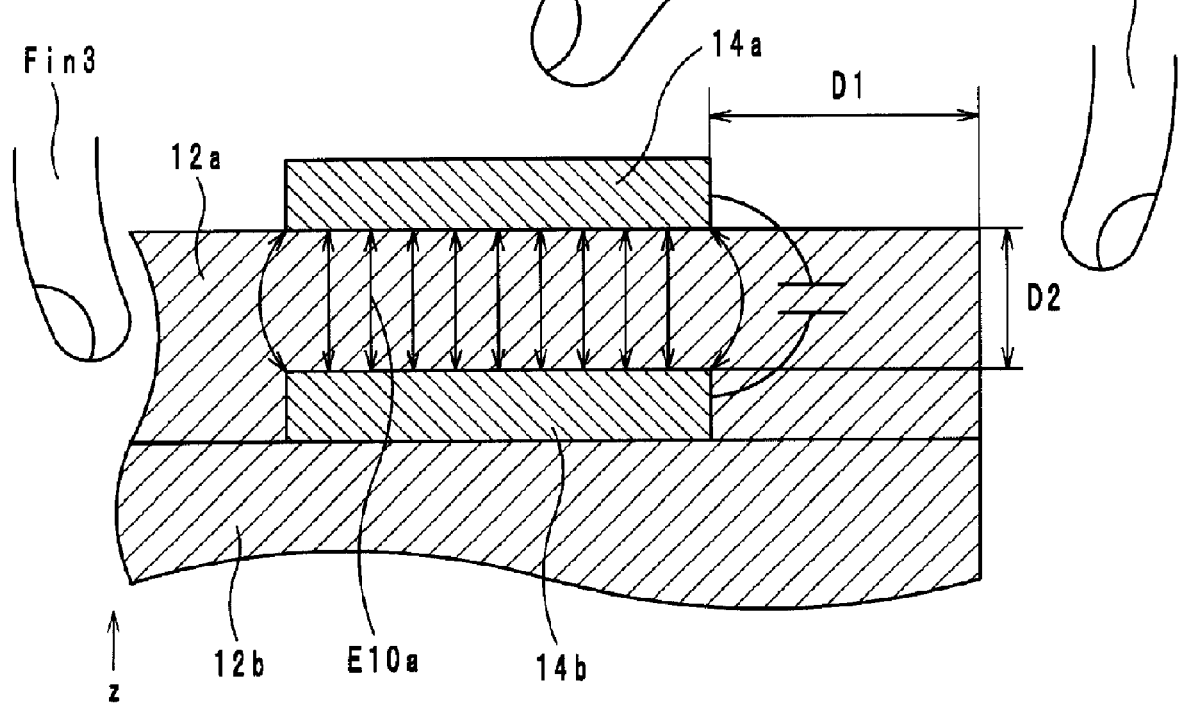
FIG. 2B is a sectional view of the wireless IC device illustrated in FIG. 2A taken along line A-A.
Figure 3:
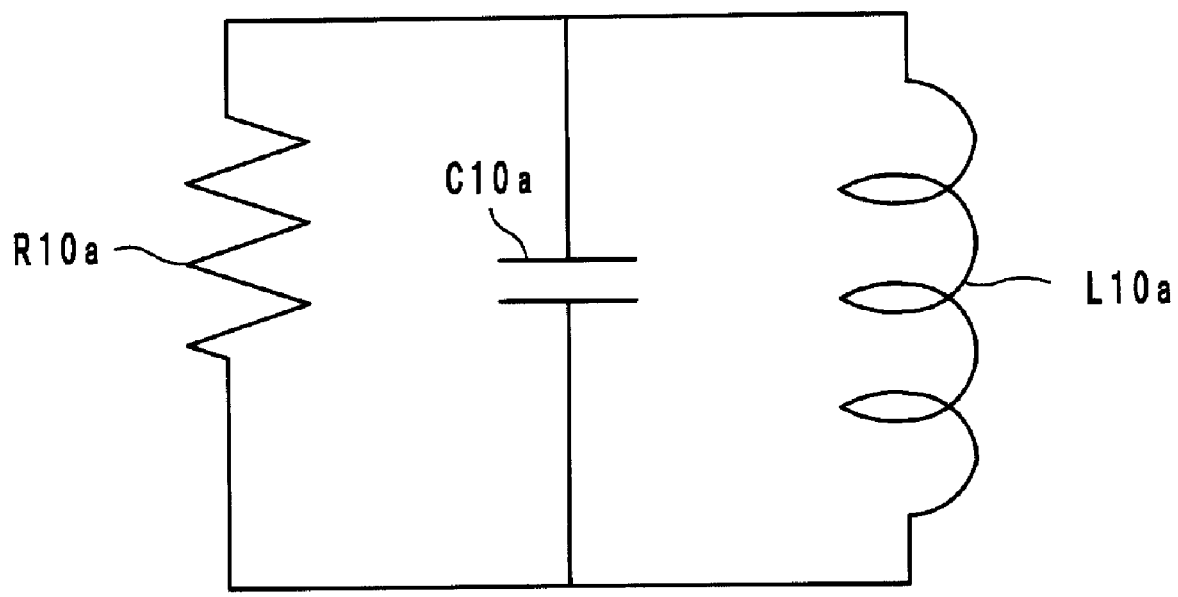
FIG. 3 is an equivalent circuit diagram of the wireless IC device illustrated in FIG. 1.

A wireless IC device according to a first preferred embodiment of the present invention will be described with reference to the drawings. FIG. 1 is an exploded perspective view of a wireless IC device 10a according to the first preferred embodiment of the present invention. In FIG. 1, the x-axis extends in the direction of long edges of the wireless IC device 10a, the y-axis extends in the direction of short edges of the wireless IC device 10a, and the z-axis extends in a direction in which layers of the wireless IC device 10a are stacked. FIG. 2A shows the wireless IC device 10a when viewed in plan from the z-axis direction. FIG. 2B is a sectional view of the wireless IC device 10a illustrated in FIG. 2A taken along line A-A. In FIG. 2B, a person's fingers are illustrated. However, the person's fingers are illustrated as being much smaller than they are in reality. FIG. 3 is an equivalent circuit diagram of the wireless IC device 10a illustrated in FIG. 1.

The wireless IC device 10a preferably has a resonant frequency of about 13.56 MHz, for example, and communicates transmission and reception signals to and from a reader/writer via an electromagnetic induction method. As illustrated in FIG. 1, the wireless IC device 10a includes insulating sheets 12a to 12d, coil electrodes 14a to 14d, a connector 16, a wireless IC 18, connectors 20a and 20d, and via-hole conductors b1 to b3 and b11 to b13. Hereafter, when indicating specific structural elements, alphabetic and/or numerical characters are provided after the reference symbols, whereas when referring to the structural elements in general, the alphabetical and/or numerical characters provided after the reference symbols are omitted.

The insulating sheets 12 are preferably rectangular sheets composed of an insulating material, for example, and are preferably manufactured using chloroethylene or polyethylene terephthalate (PET) resin sheets, for example. A direction perpendicular to the insulating sheets 12 corresponds to the z-axis direction.

The coil electrodes 14a to 14d are respectively arranged on the insulating sheets 12a to 12d and are preferably made of a metal foil, such as copper foil or aluminum foil, for example, so as to have the same or substantially the same line width. The coil electrodes 14a to 14d are connected to one another and thereby define an antenna coil L having a helical shape that spirals and extends in the z-axis direction. More specifically, each of the coil electrodes 14 is preferably arranged such that four line-shaped electrodes that extend along the edges of the insulating sheet 12 are connected to one another so as to define a rectangular ring from which a portion has been cut out, for example. In other words, the coil electrodes 14 each wind through a length less than one circuit about a coil axis of the antenna coil L.

Furthermore, as illustrated in FIG. 2A, the coil electrodes 14a to 14d are superposed with one another and thereby define a single rectangular ring when viewed in plan from the z-axis direction. That is, the coil electrodes 14a to 14d are configured so as not to be arranged side by side with one another and close to one another in the xy-plane, and, as illustrated in FIG. 2B, are arranged so as to oppose each other and sandwich one of the insulating layers 12 therebetween. In addition, since the connectors 16 and 20 connect the coil electrodes 14 and the wireless IC 18 to one another and connect the coil electrodes 14 to one another, it is necessary to arrange the connectors 16 and 20 so as to extend to the inside or the outside of the antenna coil L. The connectors 16 and 20 are preferably side by side with each other and close to the coil electrodes 14 in the xy-plane. However, the degree of closeness does not significantly affect the resonant frequency of the wireless IC device 10a and thus, this arrangement is acceptable in the wireless IC device 10a according to this preferred embodiment.

The via hole conductor b1 is a connection conductor that is arranged to extend through the insulating sheet 12a and connect the coil electrode 14a and the coil electrode 14b to each other. The via hole conductor b2 is a connection conductor that is arranged to extend through the insulating sheet 12b and connect the coil electrode 14b and the coil electrode 14c to each other. The via hole conductor b3 is a connection conductor that is arranged to extend through the insulating sheet 12c and connect the coil electrode 14c and the coil electrode 14d to each other. In this manner, the coil electrodes 14a to 14d are electrically connected to one another and define the antenna coil L. In addition, when viewed in plan from the z-axis direction, as illustrated in FIG. 1, the via hole conductors b1 to b3 are preferably provided at locations such that the coil electrodes 14a and 14d are superposed with each other.

The wireless IC 18 is mounted on the insulating sheet 12a and is an integrated circuit arranged to process transmission and reception signals exchanged with the reader/writer. When the wireless IC device 10a is used as a commuter pass, the wireless IC 18 preferably stores information regarding, for example, the zones in which the commuter pass can be used and the owner of the commuter pass. Such information may preferably be rewritable and an information processing function other than that of the RFID system including the reader/writer and the wireless IC device 10a may preferably be provided.

The connector 16 is preferably defined by a metal foil arranged on the insulating sheet 12a located on the uppermost side in the z-axis direction and is connected to the wireless IC 18.

The connector 20a is preferably defined by a metal foil arranged on the insulating sheet 12a located on the uppermost side in the z-axis direction and is connected to the coil electrode 14a and the wireless IC 18. In more detail, one end of the connector 20a is connected to an end portion of the coil electrode 14a on the side not connected to the via hole conductor b1 and the other end of the connector 20a is connected to the wireless IC 18.

The connector 20d is preferably defined by a metal foil arranged on the insulating sheet 12d located on the lowermost side in the z-axis direction and is connected to the coil electrode 14d. In more detail, one end of the connector 20d is connected to an end portion of the coil electrode 14d on the side not connected to the via hole conductor b3. Furthermore, the other end of the connector 20d is superposed with the connector 16 when viewed in plan from the z-axis direction.

The via hole conductors b11 to b13 are preferably arranged so as to extend through the insulating sheets 12a to 12d and connect the connectors 16 and 20d with each other. The via hole conductors b11 to b13 are provided at the same or substantially the same position when viewed in plan from the z-axis direction.

The wireless IC device 10a is preferably formed by stacking the plurality of insulating sheets 12a to 12d on top of one another, as illustrated in FIG. 1. Accordingly, the wireless IC device 10a defines an equivalent circuit as illustrated in FIG. 3. A capacitance C10a of the coil electrode 14a is connected in parallel with and between an inductance L10a of the antenna coil L and a resistance R10a of the wireless IC 18. In addition, the parasitic capacitance of the wireless IC 18 is omitted from FIG. 3.

Furthermore, in the wireless IC device 10a, in a state in which the insulating layers 12a to 12d have been stacked on top of one another, the minimum value of the distance between the outer edge of the ring defined by the coil electrodes 14 and the outer edges of the insulating sheets 12 illustrated in FIG. 2A is preferably greater than the distance between the coil electrodes 14 in the z-axis direction. As illustrated in FIG. 2B, a distance D1 between the outer edges of the coil electrodes 14 and the outer edges of the insulating sheets 12 is greater than a distance D2 between the coil electrodes 14 in the z-axis direction.

With the wireless IC device 10a, variations of the resonant frequency during use greatly reduced, as will be described below.

Figure 20A:
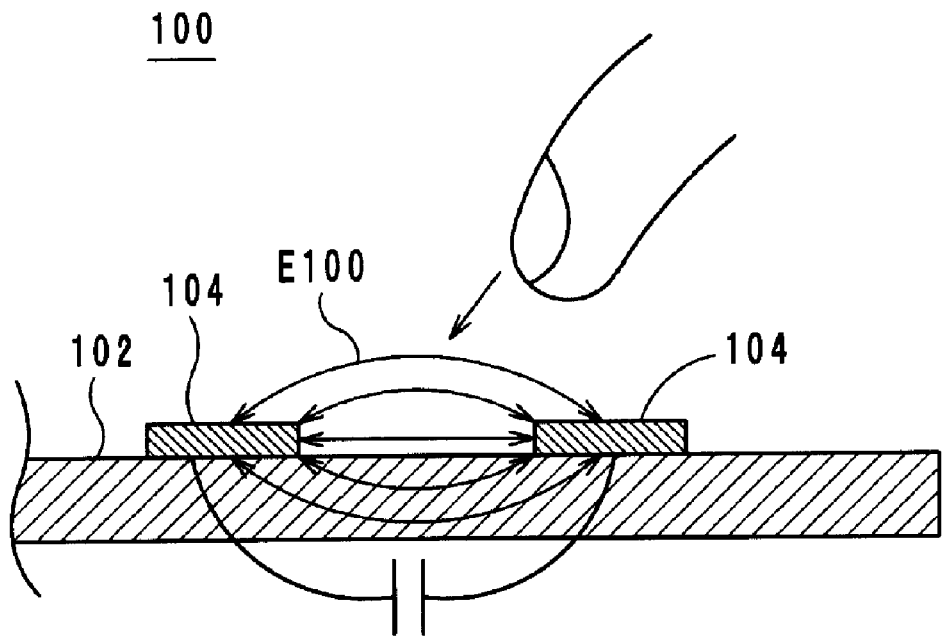
FIG. 20A is a sectional structural view of an antenna coil and a substrate of the non-contact IC card taken along the line B-B and FIG. 20B is an equivalent circuit diagram of the non-contact IC card.

In the non-contact IC card 100 of the related art, since the antenna coil 104 winds in a spiral shape a plurality of times on a main surface of a substrate 102, as illustrated in FIG. 20A, the wires defining the antenna coil 104 are arranged close to and side by side with each other on the main surface. When a current flows through the closely arranged wires, due to the potential difference between the wires, electric force lines E100 are generated that link the wires, as illustrated by the arrows in FIG. 20A, and a capacitance C100 is generated between the wires. The electric force lines E100 are generated such that they circulate above the main surface of the non-contact IC card 100. Therefore, when the non-contact IC card 100 is held, the electric force lines E100 pass through the person's hand. The dielectric constant of a person's hand is much greater than that of air, and therefore, when the person's hand is close to the space between the wires of the antenna coil 104, the capacitance C100 generated between the wires of the antenna coil 104 is increased. As a result, the resonant frequency of the non-contact IC card 100 is reduced to less than the desired resonant frequency.

Then, since the manner in which the non-contact IC card 100 is held often differs depending on the use, the positional relationship between the wires of the antenna coil 104 and the person's hand is not fixed. Therefore, the amount by which the capacitance C100 increases also varies during use and the amount by which the resonant frequency of the non-contact IC card 100 decreases also varies during use. In other words, the resonant frequency of the non-contact IC card 100 varies during use.

In contrast, in the wireless IC device 10a, the coil electrodes 14a to 14d are superposed with one another in the axial direction as illustrated in FIG. 2A. Therefore, when a current flows through the antenna coil L, as illustrated in FIG. 2B, in the space between the opposing coil electrodes 14, i.e., between the coil electrode 14a and the coil electrode 14b in FIG. 2B, electric force lines E10a are generated that contribute to forming the capacitance C10a illustrated in FIG. 3. In other words, the electric force lines E10a are not generated above the coil electrode 14a in the z-axis direction. As a result, as illustrated in FIG. 2B, even when a person's finger Fin1 is close to the coil electrode 14a, the electric force lines E10a do not pass through the person's finger Fin1. Therefore, the capacitance C10a does not vary with the manner in which the wireless IC device 10a is held and variations of the resonant frequency of the wireless IC device 10a during use are greatly reduced.

Figure 4A:
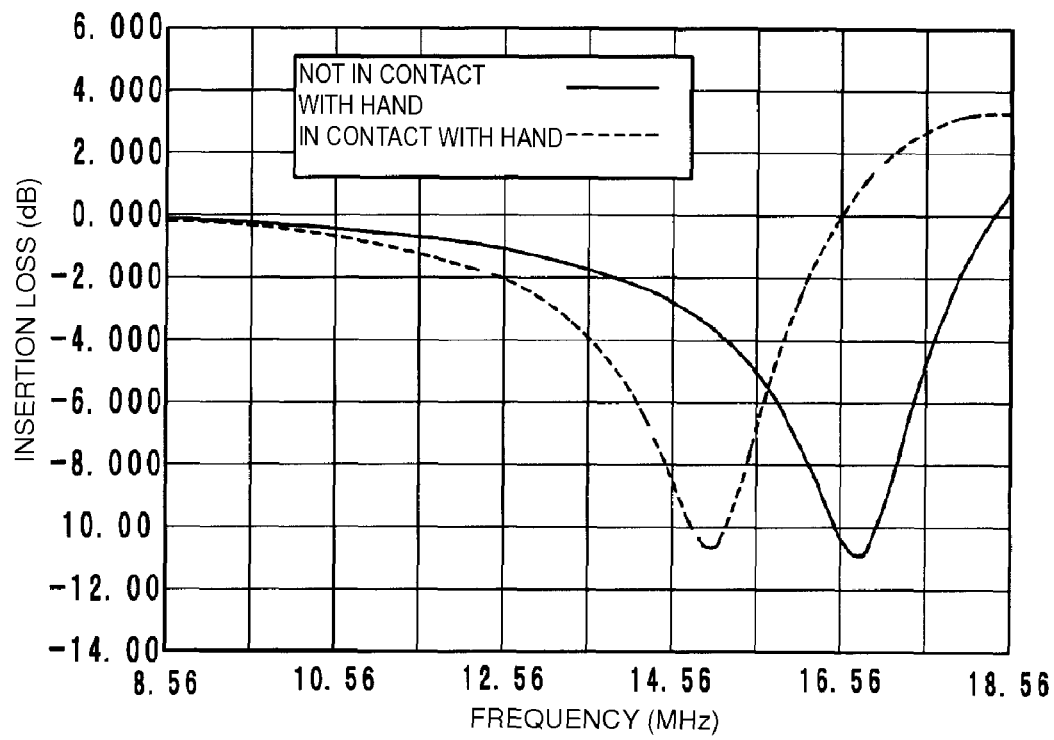
FIG. 4A is a graph illustrating a loss characteristic of a first sample and FIG. 4B is a graph illustrating a loss characteristic of a second sample.
Figure 4B:
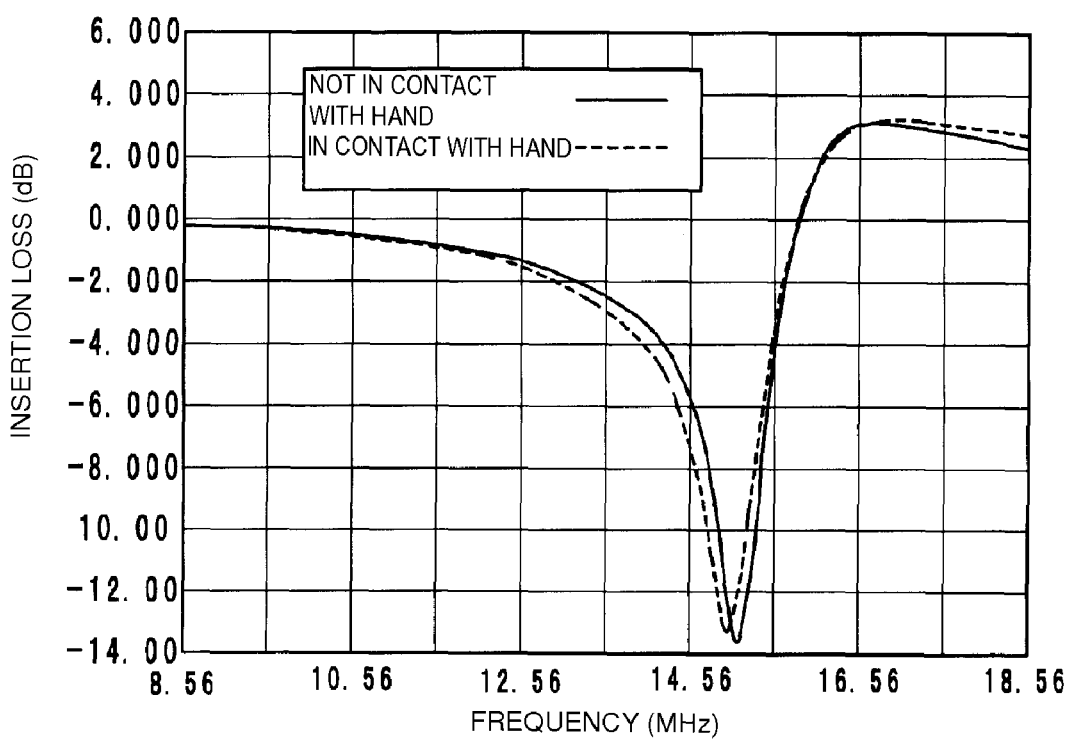
Figure 20B:
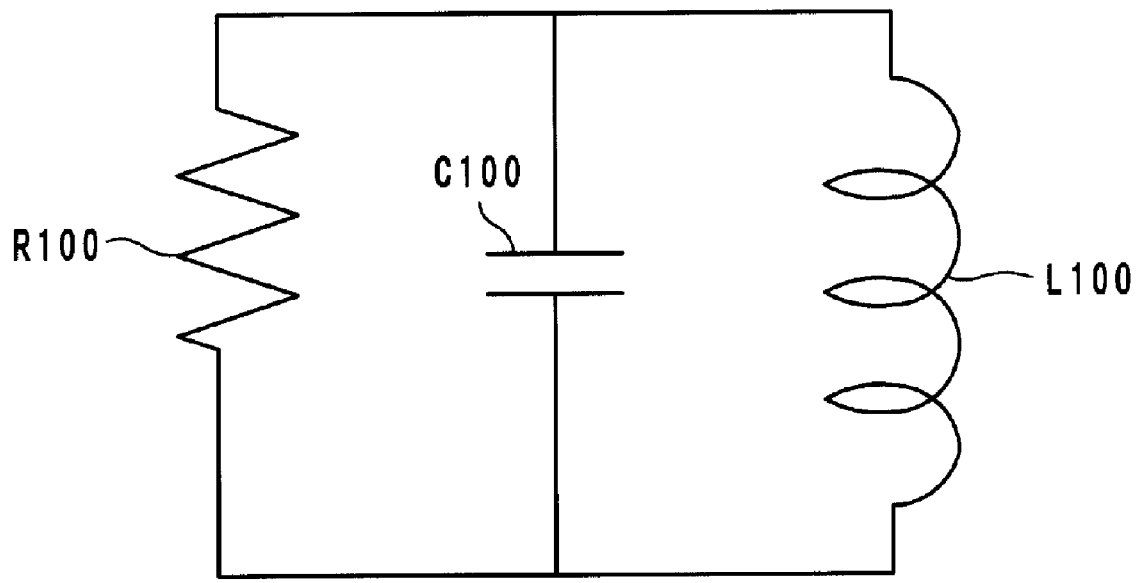

The inventors of the present invention conducted the experiments described below. Specifically, a sample of the non-contact IC card 100 (first sample) illustrated in FIGS. 20A and 20B was manufactured and a sample of the wireless IC device 10a (second sample) illustrated in FIG. 1 was manufactured. The line width of the antenna coil 104 of the first sample was set to about 1 mm and the line width of the coil electrodes 14 of the second sample was set to about 3 mm. The resonant frequencies of the first and second samples were measured in a state in which the first and second samples were in contact with a hand and in a state in which they were not in contact with a hand. FIG. 4A is a graph illustrating a loss characteristic of the first sample and FIG. 4B is a graph illustrating a loss characteristic of the second sample. The vertical axis represents insertion loss (dB) and the horizontal axis represents frequency (Mhz).

As illustrated in FIGS. 4A and 4B, in the state in which a hand is not in contact with the samples, the resonant frequency is a slightly greater than about 13.56 MHz for both of the first and second samples. Here, when a hand contacts the first sample and the second sample, the resonant frequency of the first sample is reduced by approximately 1.8 MHz. Whereas, the resonant frequency of the second sample is negligibly reduced by approximately 0.11 MHz. Accordingly, it is clear that the resonant frequency of the wireless IC device 10a according to the present preferred embodiment is negligibly reduced even when the device is in contact with a hand, in contrast to the resonant frequency of the non-contact IC card 100 that is significantly reduced by contact with a hand.

From the above experiment, it was possible to theoretically and experimentally clarify that, with the wireless IC device 10a, between being in a state in which the device is held in a hand and being in a state in which the device is not held in a hand, the resonant frequency negligibly changes. Furthermore, it can also be understood that the resonant frequency of the wireless IC device 10a does not vary with the manner in which the wireless IC device 10a is held from the fact that, between being in a state in which the wireless IC device 10a is held in a hand and being in a state in which wireless IC device 10a is not held in a hand, the resonant frequency of the wireless IC device 10a negligibly changes.

Figure 19A:
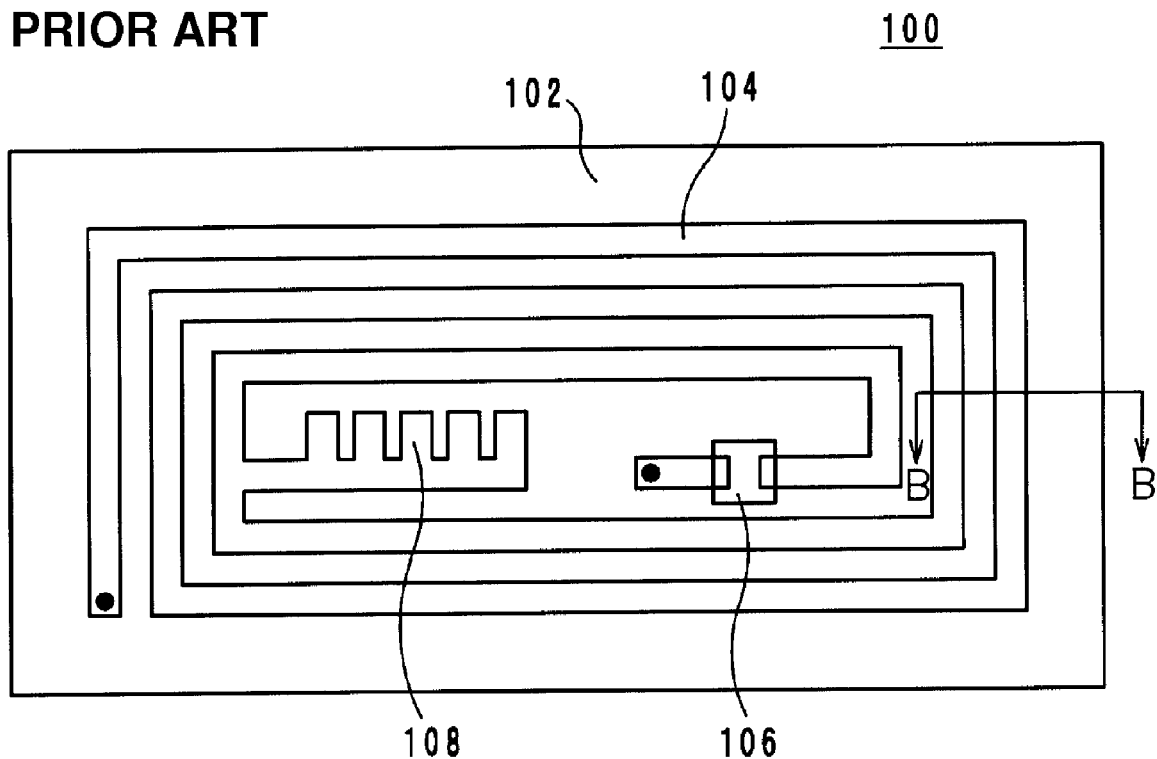
FIG. 19A is a top surface view of a non-contact IC card described in Japanese Unexamined Patent Application Publication No. 2001-10264
Figure 19B:
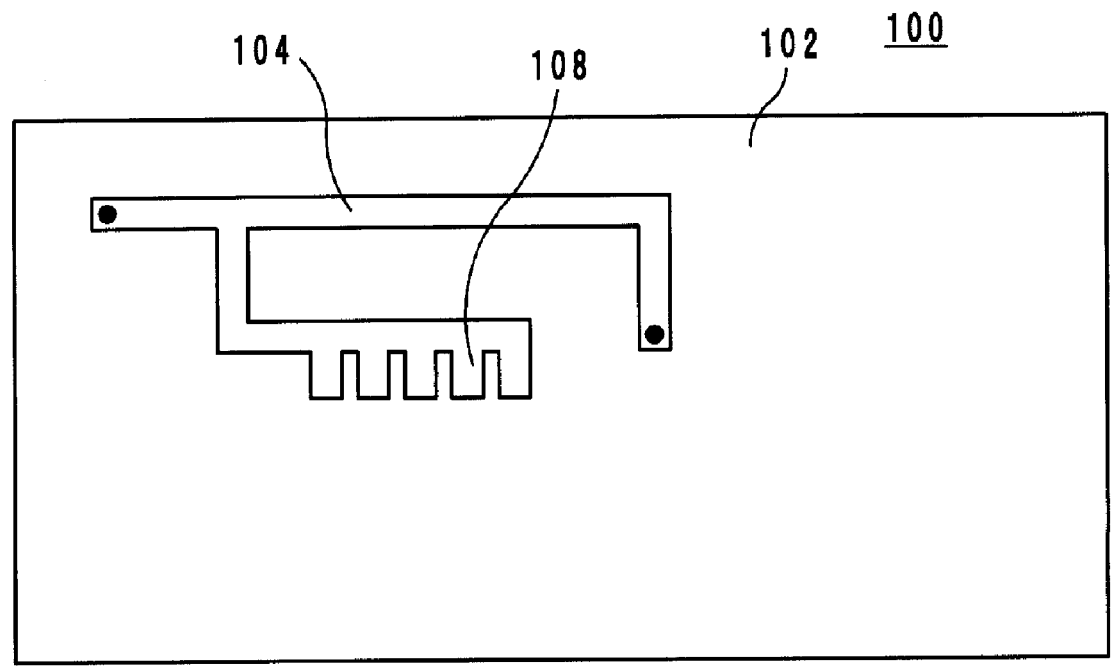
FIG. 19B is a bottom surface view of the non-contact IC card described in Japanese Unexamined Patent Application Publication No. 2001-10264.

In addition, with the wireless IC device 10a, as will be described below, variations of the resonant frequency due to the material of an overlay sheet is not likely to occur. The non-contact IC card 100 and the wireless IC device 10a are typically used in a state in which they are sandwiched from above and below by overlay sheets on which a design is printed. Such overlay sheets are typically manufactured using a resin, paper or other suitable material, for example, and therefore, have a dielectric constant that is greater than that of air. Therefore, with the non-contact IC card 100 shown in FIG. 19A, when the overlay sheets are adhered, since the electric force lines E100, which contribute to the capacitance C100, pass through the overlay sheets, the capacitance C100 of the non-contact IC card 100 is increased and the resonant frequency of the non-contact IC card 100 is reduced. Consequently, the non-contact IC card 100 shown in FIG. 19A is designed such that the resonant frequency is slightly greater than the desired resonant frequency so as to obtain the desired resonant frequency after the overlay sheets are adhered thereto.

However, since overlay sheets can be manufactured from a variety of materials having different dielectric constants, such as resins and paper, for example, the dielectric constants of the overlay sheets vary depending on the material. Therefore, with the non-contact IC card 100, the resonant frequency varies depending on the material used for the overlay sheets and in some circumstances the desired resonant frequency cannot be obtained.

In contrast, with the wireless IC device 10a, as illustrated in FIG. 2B, the electric force lines E10a that contribute to the capacitance C10a do not leak to outside the wireless IC device 10a and are generated only between the opposing coil electrodes 14. Therefore, even when overlay sheets have been adhered to the wireless IC device 10a, since the electric force lines E10a do not pass through the overlay sheets, changes of the resonant frequency before and after the overlay sheets are adhered are greatly reduced. In other words, with the wireless IC device 10a, variations of the resonant frequency due to the material of the overlay sheets are not likely to occur.

Furthermore, with the wireless IC device 10a, since the resonant frequency negligibly changes before and after adhesion of the overlay sheets, it is unnecessary to predict the amount by which the resonant frequency will be reduced by the overlay sheets when designing the wireless IC device 10a. As a result, designing of the wireless IC device 10a can be simplified and the cost of designing the wireless IC device 10a can be reduced.

In addition, with the wireless IC device 10a, since the resonant frequency negligibly changes before and after adhering of the overlay sheets, it is also not necessary to adjust the resonant frequency by trimming the adjustment capacitor 108 during manufacturing, as was necessary with the non-contact IC card 100 described in Japanese Unexamined Patent Application Publication No. 2001-10264. Trimming the adjustment capacitor 108 has been problematic due to the fact that, for example, since the adjustment capacitor 108 has often been trimmed by being burned away by irradiation of a laser beam, manufacturing defects have arisen due to holes being formed in the insulating sheets and shorting of contacts. In contrast, with the wireless IC device 10a, since the adjustment capacitor 108 is unnecessary, this kind of problem does not arise.

Furthermore, with the wireless IC device 10a, the minimum value of the distance D1 between the outer edge of the ring defined by the coil electrodes 14 illustrated in FIG. 2B and the outer edges of the insulating sheets 12 is preferably greater than the distance D2 in the z-axis direction between the coil electrodes 14. Consequently, as will be described below, variations of the resonant frequency during use of the wireless IC device 10a can be more effectively prevented.

In more detail, for example, the wireless IC device 10a is sometimes held by grasping the long edges or the short edges thereof as illustrated in FIG. 2A. In such a case, as illustrated in FIG. 2B, a person's finger Fin2 is located on a side surface of the wireless IC device 10a. Here, as illustrated in FIG. 2B, the electric force lines E10a, in addition to being linearly generated between the coil electrode 14a and the coil electrode 14b, also slightly extend to the outside from the region sandwiched between the coil electrode 14a and the coil electrode 14b. Therefore, when the distance between the outer edge of the ring defined by the coil electrodes 14 and the outer edges of the insulating sheets 12 is relatively small, there is a risk that the electric force lines E10a will extend to outside the insulating sheets 12. As a result, there is a risk of the capacitance C10 changing and the resonant frequency of the wireless IC device 10a changing due to the presence of the person's finger Fin2.

Consequently, with the wireless IC device 10a, as illustrated in FIG. 2B, extending of the electric force lines E10a to outside the region sandwiched between the coil electrodes 14 and to outside the wireless IC device 10a is prevented by setting the distance D1 to be greater than the distance D2. Accordingly, even when the wireless IC device 10a is held by grasping the long edges or the short edges thereof, the electric force lines E10a are prevented from passing through the person's finger Fin2. As a result, variations of the resonant frequency of the wireless IC device 10a due to the manner in which the wireless IC device 10a is held is more effectively prevented.

In addition, in the wireless IC device 10a, when viewed in plan from the z-axis direction, the via hole conductors b1 to b3 are arranged at locations so as to be superposed with the coil electrodes 14a and 14d, as illustrated in FIG. 1. Therefore, electric force lines generated between the via hole conductors b1 to b3 and the coil electrodes 14 and that extend towards the outside of the wireless IC device 10a are blocked by the coil electrodes 14. As a result, variations of the resonant frequency during use of the wireless IC device 10a can be effectively prevented.

Second Preferred Embodiment

Figure 5:
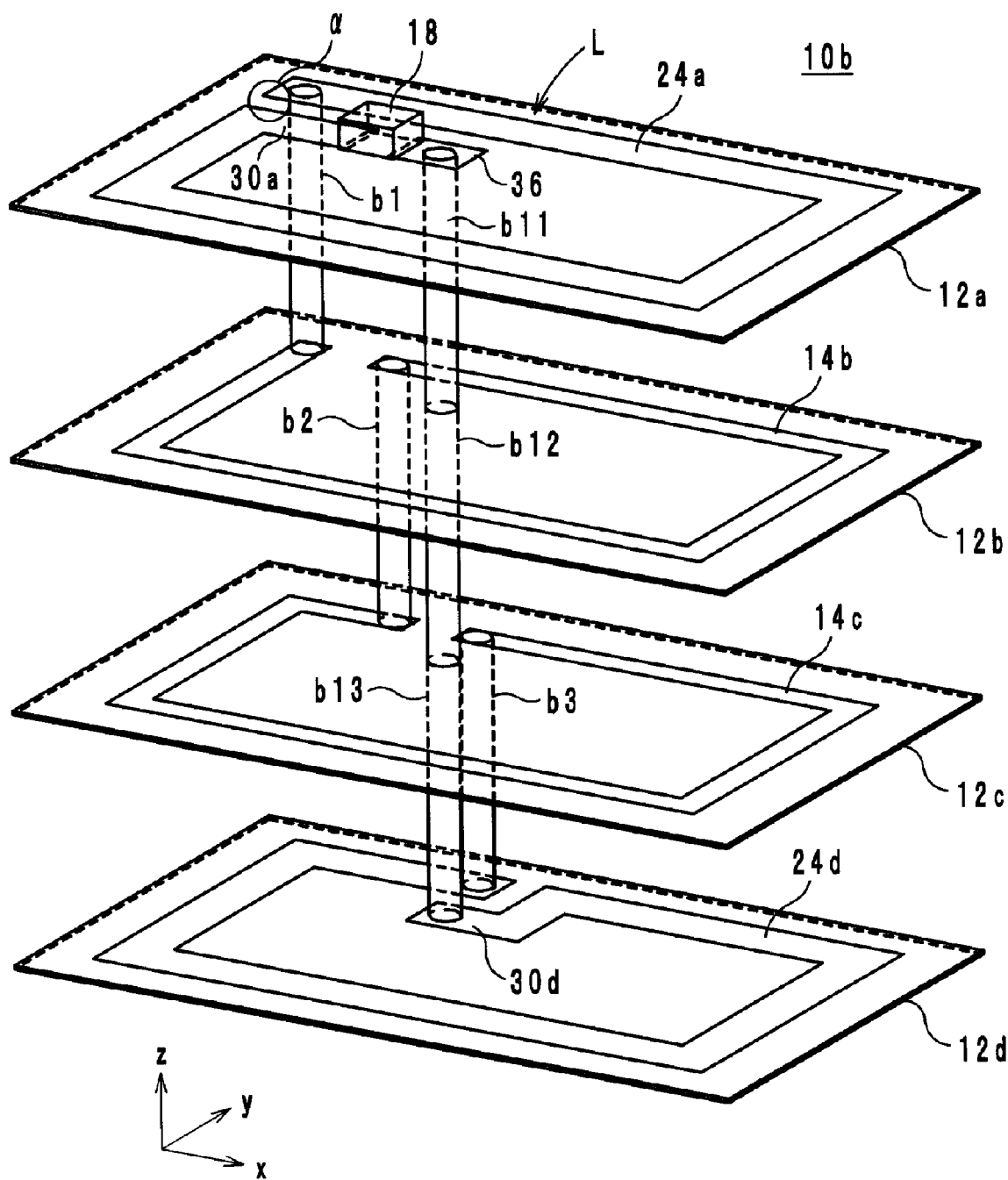
FIG. 5 is an exploded perspective view of a wireless IC device according to a second preferred embodiment of the present invention.
Figure 6:
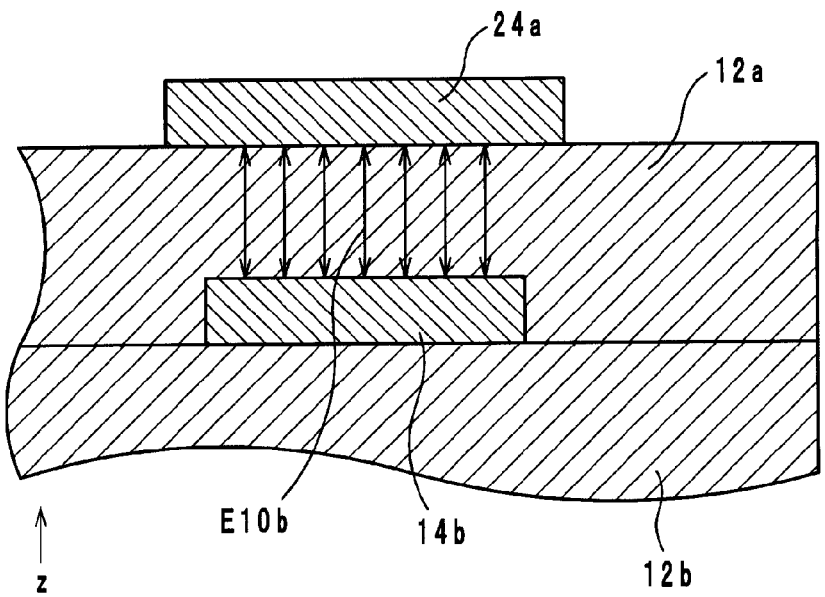
FIG. 6 is a sectional view of the wireless IC device of FIG. 5 in the zy-plane.

A wireless IC device according to a second preferred embodiment of the present invention will be described with reference to the drawings. FIG. 5 is an exploded perspective view of a wireless IC device 10b according to the second preferred embodiment. In FIG. 5, the x-axis extends in the direction of the long edges of the wireless IC device 10b, the y-axis extends in the direction of the short edges of the wireless IC device 10b, and the z-axis extends in a direction in which layers of the wireless IC device 10b are stacked. FIG. 6 is a sectional view of the wireless IC device 10b in the zy-plane. In addition, in FIGS. 5 and 6, components and features that are the same or substantially the same as to those in FIGS. 1, 2A, and 2B are denoted by the same reference symbols.

The difference between the wireless IC device 10a and the wireless IC device 10b is that the coil electrodes 14a and 14d of the wireless IC device 10a are replaced with the coil electrodes 24a and 24d in the wireless IC device 10b. The line width of the coil electrodes 24a and 24d is set to be greater than the line width of the coil electrodes 14a and 14b. Accordingly, the coil electrodes 24a and 24d, which are arranged at either end in the z-axis direction, have a line width that is greater than the line width of the coil electrodes 14b and 14c.

Furthermore, the coil electrodes 24a and 24d cover at least a portion of the coil electrodes 14b and 14c in the line width direction when viewed in the plan from the z-axis direction. As illustrated in FIG. 6, the coil electrode 14b is arranged such that both ends thereof fit within the coil electrode 24a and do not protrude therefrom in the line width direction. Therefore, electric force lines E10b generated between the coil electrode 24a and the coil electrode 14b are not likely to extend to outside the coil electrode 24a when viewed in plan from the z-axis direction. As a result, the electric force lines E10b are not likely to pass through the person's hand even when the wireless IC device 10b is held by grasping the long edges or short edges thereof. As a result, variations of the resonant frequency during use of the wireless IC device 10b can be more effectively prevented.

The phase "covers at least a portion of" means, for example, that the coil electrode 24a need not entirely cover the coil electrode 14b, since there is a portion, such as portion a in FIG. 5, above the coil electrode 14b in the z-axis direction in which the coil electrode 24a is not provided.

In addition, since the remaining configuration of the wireless IC device 10b is the same or substantially the same as that of the wireless IC device 10a, description thereof is omitted.

Third Preferred Embodiment

Figure 7:
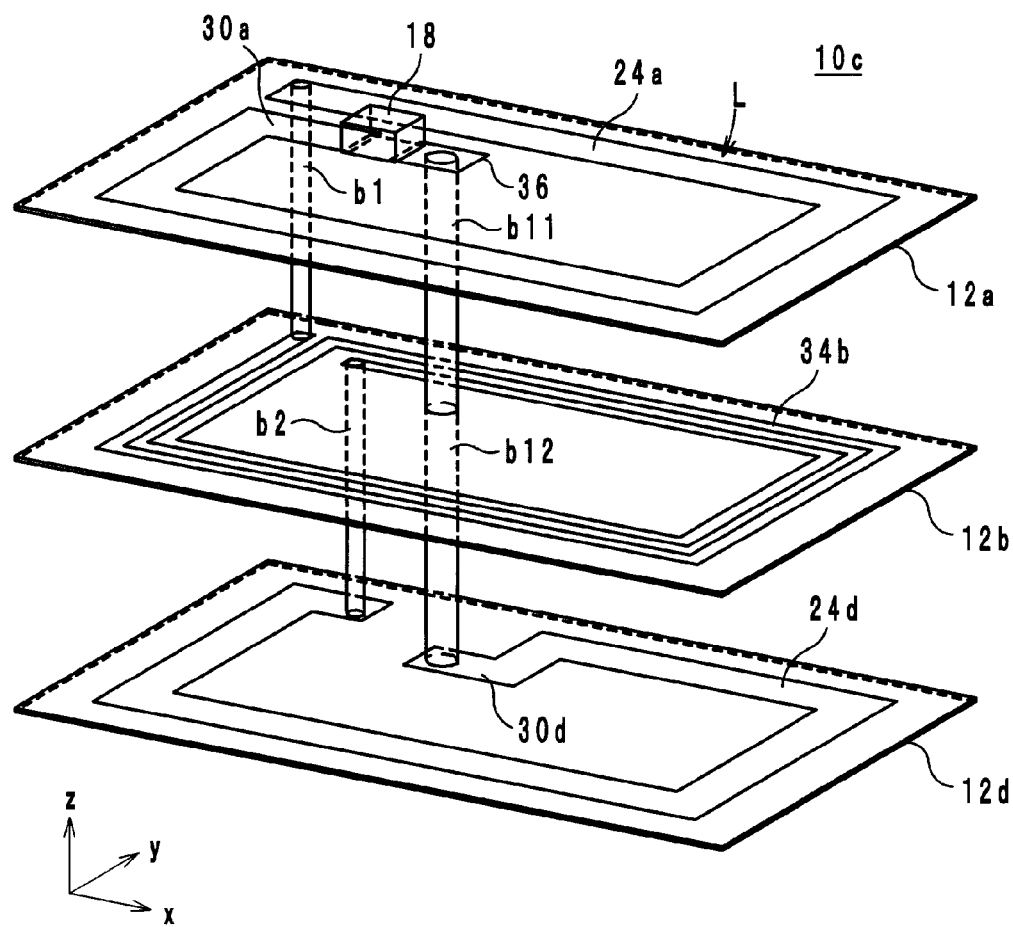
FIG. 7 is an exploded perspective view of a wireless IC device according to a third preferred embodiment of the present invention.
Figure 8:
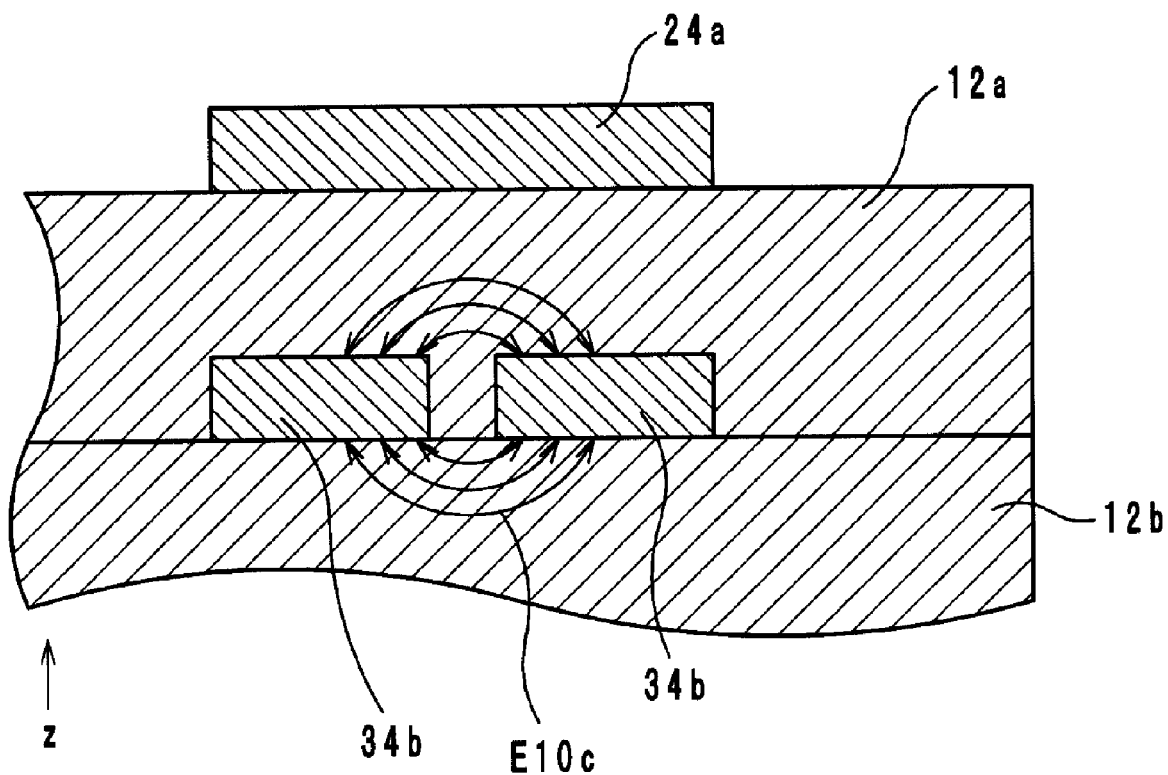
FIG. 8 is a sectional view of the wireless IC device of FIG. 7 in the zy-plane.

A wireless IC device according to a third preferred embodiment of the present invention will be described with reference the drawings. FIG. 7 is an exploded perspective view of a wireless IC device 10c according to the third preferred embodiment of the present invention. In FIG. 7, the x-axis extends in the direction of the long edges of the wireless IC device 10c, the y-axis extends in the direction of the short edges of the wireless IC device 10c, and the z-axis extends in a direction in which layers of the wireless IC device 10c are stacked. FIG. 8 is a sectional view of the wireless IC device 10c in the zy-plane. In addition, in FIGS. 7 and 8, components and features that are the same or substantially the same as those in FIGS. 5 and 6 are denoted by the same reference symbols.

The difference between the wireless IC device 10b and the wireless IC device 10c is that the insulating sheet 12c is not provided and the coil electrode 14b is replaced with a coil electrode 34b.

In contrast to the wireless IC device 10b, which was preferably formed by stacking four of the insulating sheets 12, the wireless IC device 10c is preferably formed by stacking three of the insulating sheets 12, as illustrated in FIG. 7. Consequently, in the wireless IC device 10c, the number of coil electrodes 14 and 34 is one less than in the wireless IC device 10b. Accordingly, in the wireless IC device 10c, the number of turns of the antenna coil L of the wireless IC device 10c is equal to the number of turns of the antenna coil L of the wireless IC device 10b preferably by extending the length of the coil electrode 34b be equal to or substantially equal to two circuits.

In addition, since the remaining configuration of the wireless IC device 10c is the same or substantially the same as those of the wireless IC device 10b, description thereof will be omitted.

As described above, provided that the coil electrodes 24a and 24d, which are arranged at either end in the z-axis direction, preferably wind through a length of less than about one circuit about the coil axis of the antenna coil L, the coil electrode 34b may wind through a length of at least one circuit about the coil axis of the antenna coil L. As a result of the wireless IC device 10c having the above-described configuration, as will be described below, variations of the resonant frequency during use can be prevented and the number of turns of the antenna coil L can be increased with a reduced number of stacked layers.

In more detail, since the coil electrode 34b winds a plurality of times around the coil axis as illustrated in FIG. 7, wires of the coil electrode 34b are preferably arranged side by side and close to each other on the insulating sheet 12b, as illustrated in FIG. 8. Therefore, when a current flows through the antenna coil L, electric force lines E10c are generated upward and downward in the z-axis direction with respect to the coil electrode 34b.

However, since the coil electrode 34b is not arranged at either end of the antenna coil L in the z-axis direction, there is a sufficient distance between the coil electrode 34b and the outside of the wireless IC device 10c. Therefore, as illustrated in FIG. 8, the electric force lines E10c generated between wires of the coil electrode 34b do not substantially extend from the wireless IC device 10c. Therefore, when the wireless IC device 10c is held in a person's hand, changes in the capacitance of the antenna coil L, due to the electric force lines E10c passing through the person's hand, are prevented.

In particular, as illustrated in FIG. 8, the coil electrodes 24a and 24d cover at least a portion of the coil electrode 34b when viewed in plan from the z-axis direction, whereby, as will be described below, variations of the resonant frequency during use of the wireless IC device 10c can be more effectively prevented. In more detail, as illustrated in FIG. 8, the coil electrode 34b is preferably arranged such that both ends thereof fit inside the coil electrodes 24a and 24d (the coil electrode 24d is not illustrated in FIG. 8) so as not to protrude therefrom in the line width direction. Consequently, the electric force lines E10c are blocked by the coil electrodes 24a and 24d and extending of the electric force lines E10c to the outside of the wireless IC device 10c is more effectively prevented. As a result, variations of the resonant frequency during use of the wireless IC device 10c can be more effectively prevented. In addition, since electric force lines generated between the coil electrode 24a and the coil electrode 34b are not likely to extend to the outside of the coil electrode 24a, variations of the resonant frequency can be prevented.

Fourth Preferred Embodiment

Figure 9:
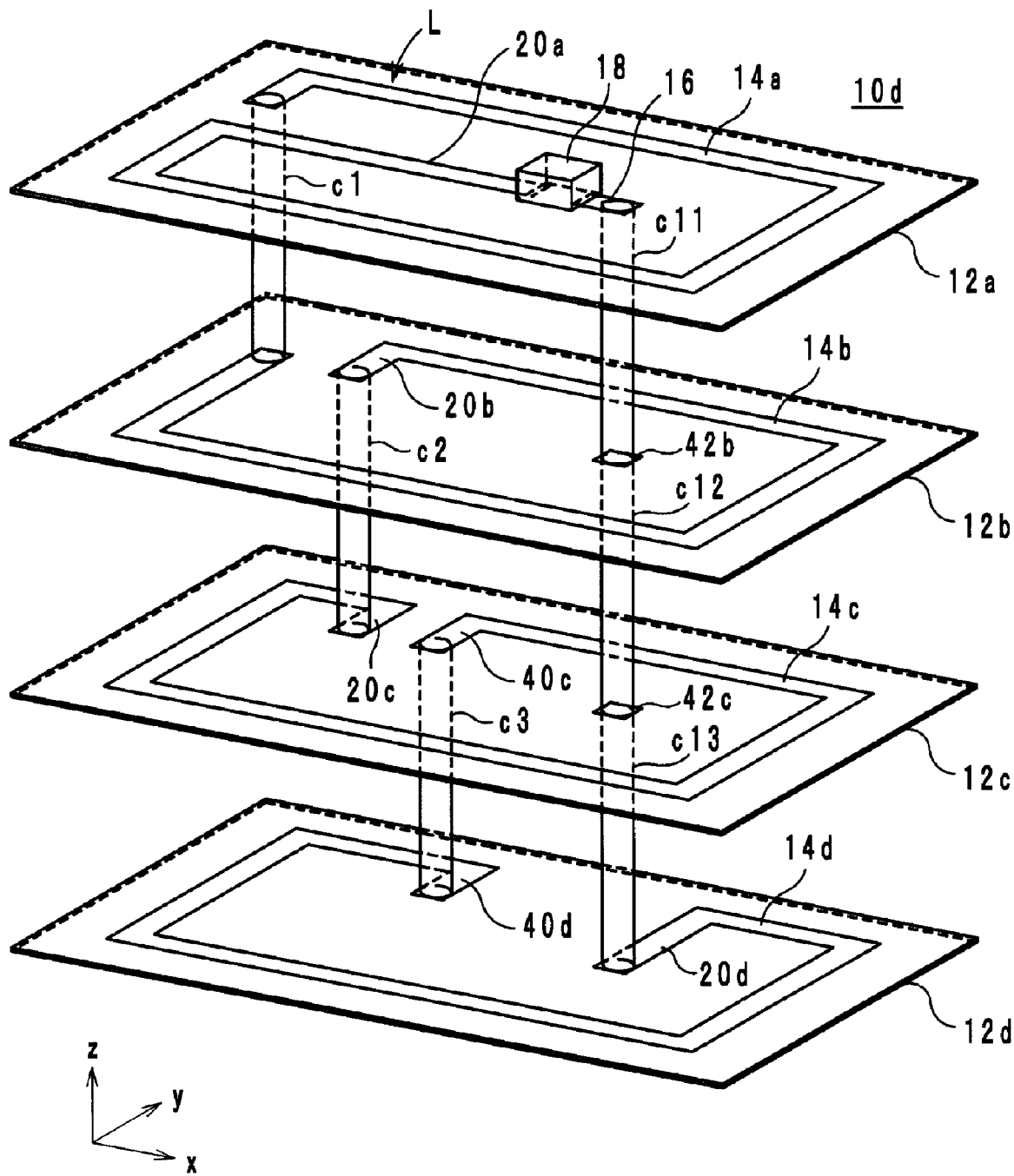
FIG. 9 is an exploded perspective view of a wireless IC device according to a fourth preferred embodiment of the present invention.
Figure 10:
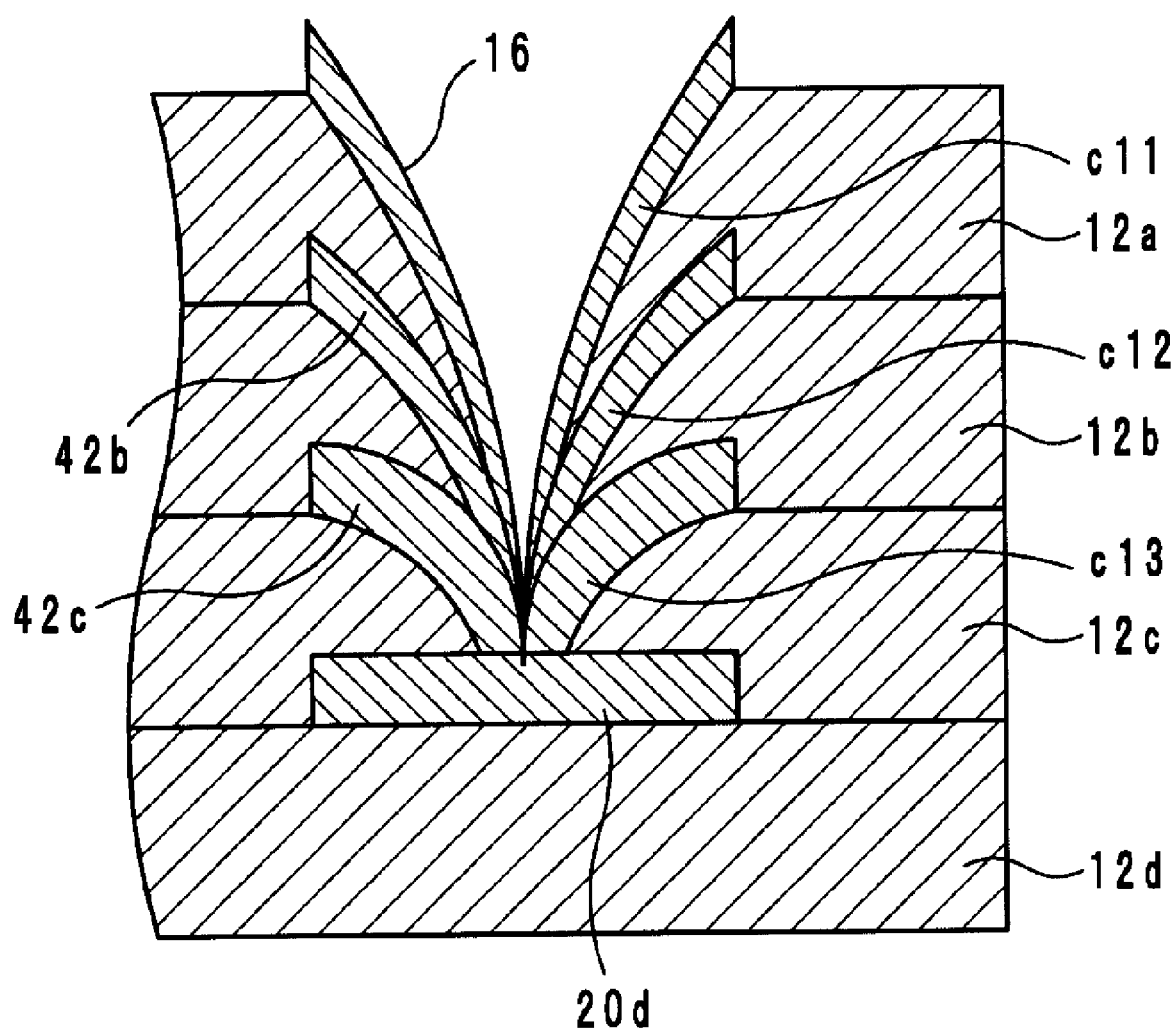
FIG. 10 is a sectional view of the vicinity of a connector of the wireless IC device of FIG. 9 in the zy-plane.

A wireless IC device according to a fourth preferred embodiment of the present invention will be described with reference to the drawings. FIG. 9 is an exploded perspective view of a wireless IC device 10d according to the fourth embodiment. In FIG. 9, the x-axis extends in the direction of the long edges of the wireless IC device 10d, the y-axis extends in the direction of the short edges of the wireless IC device 10d, and the z-axis extends in a direction in which layers of the wireless IC device 10d are stacked. FIG. 10 is a sectional view in the vicinity of the connector 16 of the wireless IC device 10d in the zy-plane. In addition, in FIGS. 9 and 10, components and features that are the same or substantially the same as those in FIGS. 1, 2A and 2B are denoted by the same reference symbols.

The difference between the wireless IC device 10a and the wireless IC device 10d is that, in the wireless IC device 10d, instead of the coil electrodes 14 being connected to one another using the via hole conductors b in the wireless IC device 10a, the coil electrodes 14 are preferably connected to one another using a pouching process in the wireless IC device 10d. This difference will be described below.

A pouching process is a process for connecting two or more electrodes that oppose one another while sandwiching insulating sheets therebetween. Specifically, by pressing a needle or a blade through one electrode, a small hole is formed that extends through the one electrode and an insulating sheet. At this time, the one electrode is plastically deformed so as to extend to another electrode along the inner circumference of the hole. As a result, the two electrodes are connected with an insulating sheet sandwiched therebetween.

Here, in the pouching process, the insulating sheets are preferably penetrated with a needle, for example. Accordingly, so as not damage the coil electrodes 14 that are not subjected to the connection process, the wireless IC device 10d includes connectors 20b, 20c, 20d, 40c, 40d, 42b and 42c, as illustrated in FIG. 9.

The connector 20b is connected to the coil electrode 14b and is arranged to extend towards the inside of the coil electrode 14b so as not to be superposed with the coil electrodes 14a, 14c and 14d in the z-axis direction. The connector 20c is connected to the coil electrode 14c and is arranged to extend toward the inside of the coil electrode 14c so as not to be superposed with the coil electrodes 14a, 14b and 14d in the z-axis direction. Ends of the connector 20b and the connector 20c are superposed with each other in the z-axis direction and are connected to each other through a connector c2 preferably formed by performing the pouching process.

Furthermore, the connector 40c is connected to the coil electrode 14c and is arranged to extend towards the inside of the coil electrode 14c so as not to be superposed with the coil electrodes 14a, 14b and 14d in the z-axis direction. The connector 40d is connected to the coil electrode 14d and is arranged to extend towards the inside of the coil electrode 14d so as not to be superposed with the coil electrodes 14a, 14b and 14c in the z-axis direction. Ends of the connector 40c and the connector 40d are superposed with each other in the z-axis direction and are connected to each other through a connector c3 preferably formed by performing the pouching process.

In addition, the connector 16 is connected to the wireless IC 18 on the insulating sheet 12a, which is arranged on the uppermost side in the z-axis direction. The connectors 42b and 42c are respectively arranged on the insulating sheets 12b and 12c, which are insulating sheets other than the insulating sheets 12a and 12d located on the uppermost and lowermost sides in the z-axis direction, so as to be superposed with the connector 16 when viewed in plan from the z-axis direction. In addition, the connector 20d arranged on the insulating sheet 12d, which is located on the lowermost side in the z-axis direction, is superposed with the connector 16 when viewed in plan from the z-axis direction and is connected to the coil electrode 14d. Then, the connectors 16, 42b, 42c and 20d are all connected together at the same or substantially the same location when viewed in plan from the z-axis direction through the connectors c11, c12 and c13 that are preferably formed by the pouching process, as illustrated in FIG. 10.

The remaining configuration of the wireless IC device 10d is the same as or similar to that of the wireless IC device 10a and therefore description thereof will be omitted.

Similar to the wireless IC device 10a, variations of the resonant frequency during use can be effectively prevented with the wireless IC device 10d.

Furthermore, in the wireless IC device 10d, the connectors 16, 42b, 42c and 20d are arranged so as to be superposed with one another when viewed in plan from the z-axis direction. Therefore, the connectors can be connected to one another by performing the pouching process a single time. As a result, the number of processes used to manufacture the wireless IC device 10d can be reduced and the cost of manufacturing the wireless IC device 10d can be reduced.

Fifth Preferred Embodiment

Figure 11A:
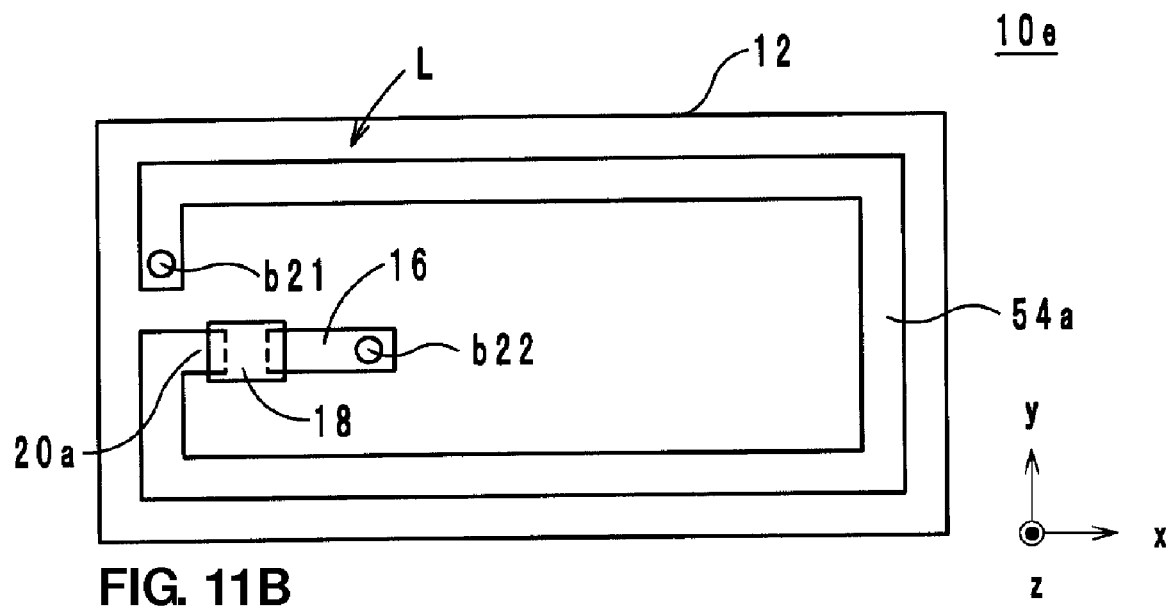
FIG. 11A is a top surface view of a wireless IC device according to a fifth preferred embodiment of the present invention.
Figure 11B:
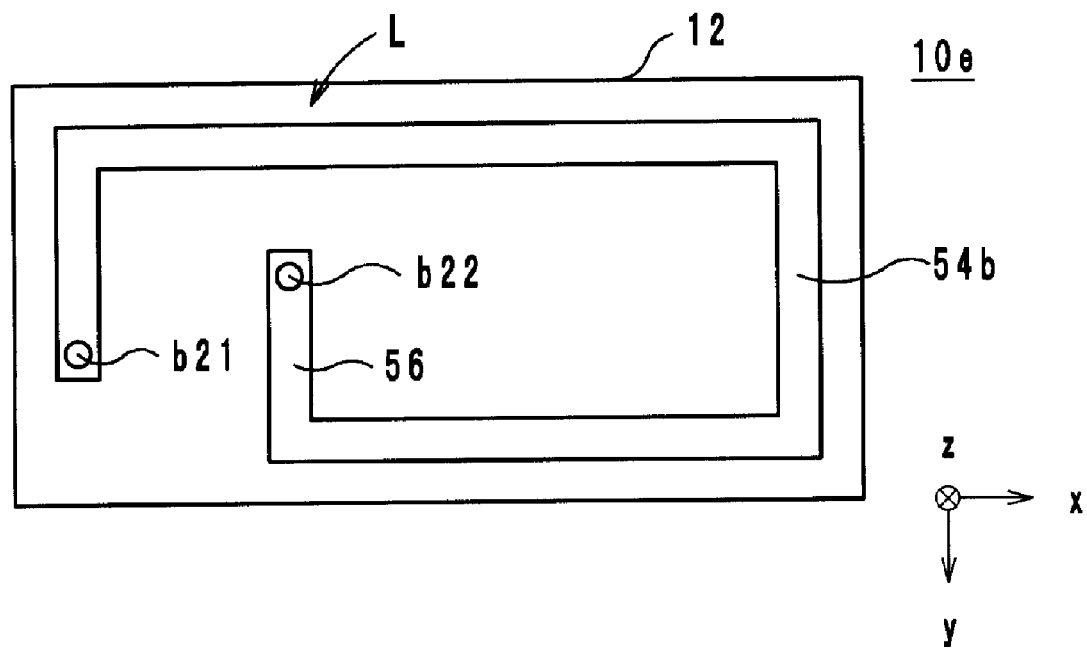
FIG. 11B is a bottom surface view of the wireless IC device according to the fifth preferred embodiment of the present invention.

A wireless IC device according to a fifth preferred embodiment of the present invention will be described with reference to the drawings. FIG. 11A is a top surface view of a wireless IC device 10e according to the fifth preferred embodiment. FIG. 11B is a bottom surface view of the wireless IC device 10e according to the fifth preferred embodiment. In FIGS. 11A and 11B, the x-axis extends in the direction of the long edges of the wireless IC device 10e, the y-axis extends in the direction of the short edges of the wireless IC device 10e, and the z-axis extends in a direction that is orthogonal to the x-axis and the y-axis. Furthermore, in FIGS. 11A and 11B, components and features that are the same or substantially the same as those in FIG. 1 are denoted by the same reference symbols.

It is not necessary for the wireless IC device according to this preferred embodiment of the present invention to include a plurality of the insulating sheets 12, as has been described for the wireless IC devices 10a to 10d. In other words, as shown in the wireless IC device 10e illustrated in FIGS. 11A and 11B, a single insulating sheet 12 may be included. Hereafter, the wireless IC device 10e will be described.

The wireless IC device 10e includes an insulating sheet 12, the connectors 16 and 20a, the wireless IC 18, coil electrodes 54a and 54b, a connector 56, and via hole conductors b21 and b22. The insulating sheet 12, the connectors 16 and 20a, and the wireless IC 18 are the same or substantially the same as the insulating sheet 12, the connectors 16 and 20a, and the wireless IC 18 of the wireless IC device 10a, and therefore, descriptions thereof will be omitted.

The coil electrode 54a is arranged on a main surface of the insulating sheet 12 on the upper side in the z-axis direction as illustrated in FIG. 11A. The coil electrode 54b is arranged on a main surface of the insulating sheet 12 on the lower side in the z-axis direction as illustrated in FIG. 11B. In other words, the coil electrodes 54a and 54b are arranged so as to sandwich the insulating sheet 12 therebetween. Then, the coil electrodes 54a and 54b are superposed with each other and thereby define a single ring when viewed in plan in the z-axis direction.

The connector 56 is connected to the coil electrode 54b and extends toward the inside of the coil electrode 54b. The via hole conductor b21 connects the coil electrode 54a and the coil electrode 54b to each other. The via hole conductor b22 connects the connector 16 and the connector 56 to each other.

Variations of the resonant frequency during use can be prevented with the wireless IC device 10e, in a similar manner as the wireless IC device 10a.

Sixth Preferred Embodiment

Figure 12:
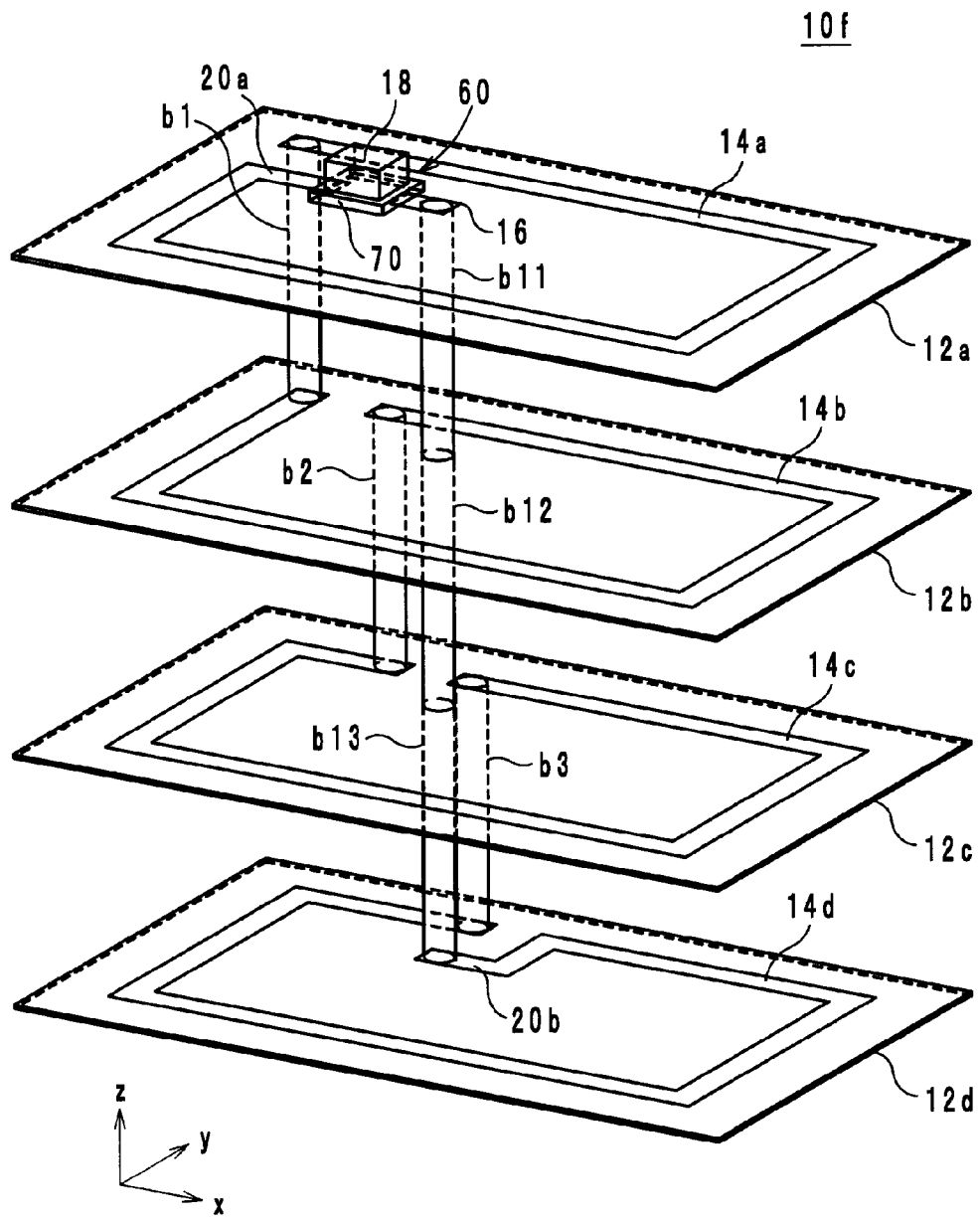
FIG. 12 is an exploded perspective view of a wireless IC device according to a sixth preferred embodiment of the present invention.
Figure 13:
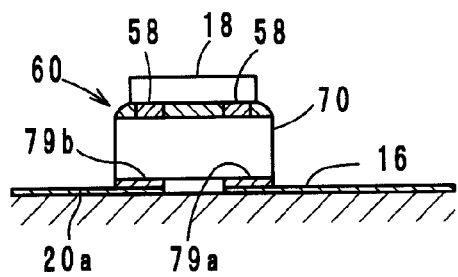
FIG. 13 is a sectional view of the vicinity of an electromagnetic coupling module of the wireless IC device of FIG. 12 in the xz-plane.

Hereafter, a wireless IC device according to a sixth preferred embodiment of the present invention will be described with reference to the drawings. FIG. 12 is an exploded perspective view of a wireless IC device 10f according to the sixth preferred embodiment. In FIG. 12, the x-axis extends in the direction of the long edges of the wireless IC device 10f, the y-axis extends in the direction of the short edges of the wireless IC device 10f, and the z-axis extends in a direction in which layers of the wireless IC device 10f are stacked. FIG. 13 is a sectional view in the vicinity of an electromagnetic coupling module 60 of the wireless IC device 10f in the xz-plane. In addition, in FIGS. 12 and 13, components and features that are the same or substantially the same as those in FIGS. 1, 2A, and 2B are denoted by the same reference symbols.

In the wireless IC device 10f, the wireless IC 18 is connected to the connectors 16 and 20a through a feeder circuit board 70, in contrast to in the wireless IC device 10a in which the wireless IC 18 is directly connected to the connectors 16 and 20a. In the wireless IC device 10f, the wireless IC 18 and the feeder circuit board 70 define the electromagnetic coupling module 60.

In more detail, connection electrodes 58 are provided on the lower surface of the wireless IC 18, as illustrated in FIG. 13. The wireless IC 18 is mounted on the feeder circuit board 70 via the connection electrodes 58. The feeder circuit board 70 includes an inductance element, which is connected to the wireless IC 18 and includes connection electrodes 79a and 79b on the lower surface thereof. The connection electrodes 79a and 79b are respectively connected to the connectors 16 and 20a.

Figure 14:
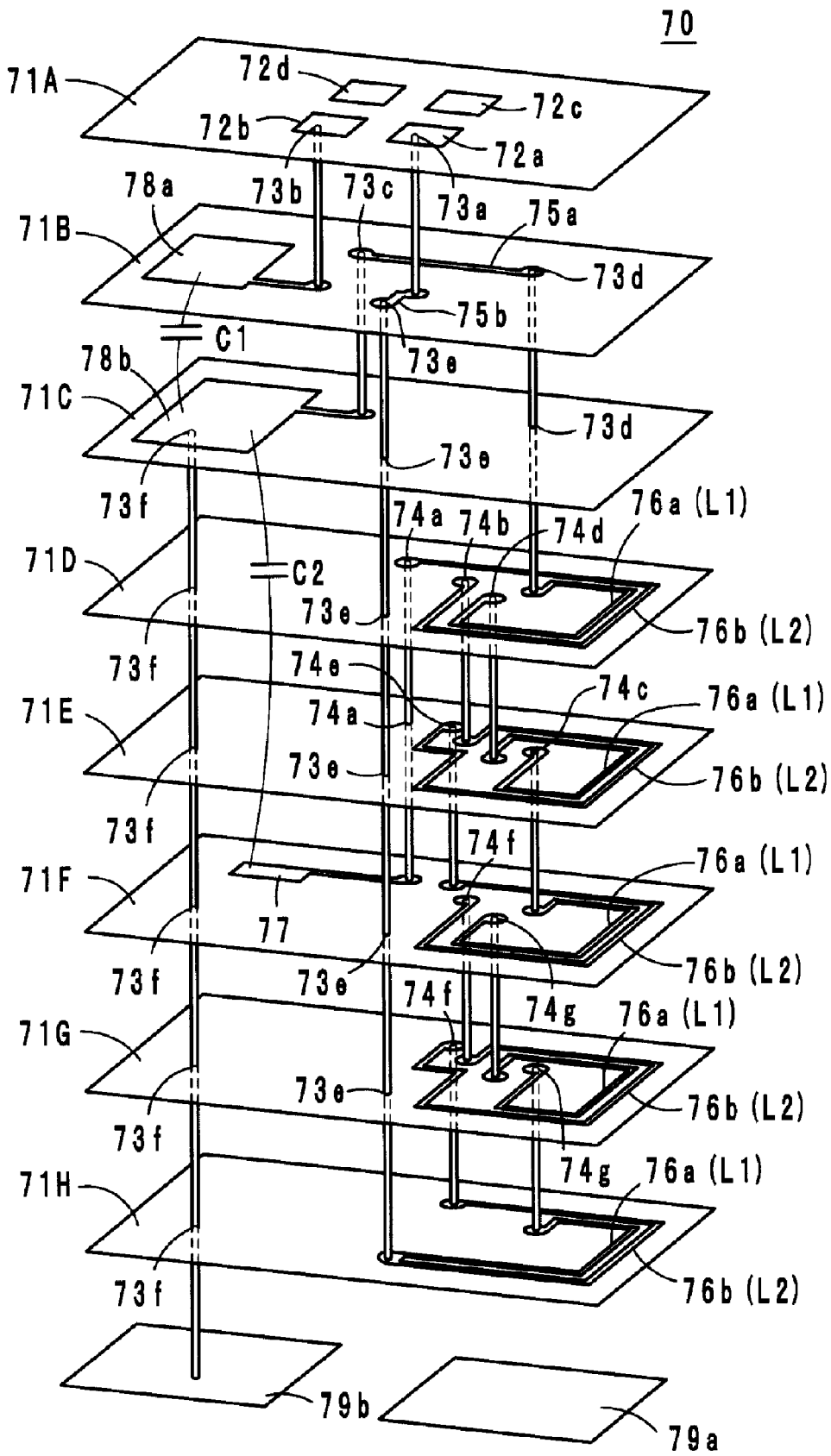
FIG. 14 is an exploded perspective view of a feeder circuit board.

Next, the feeder circuit board 70 will be described in detail with reference to FIG. 14. FIG. 14 is an exploded perspective view of the feeder circuit board 70.

The feeder circuit board 70 is preferably formed by stacking, pressure bonding and baking ceramic sheets 71A to 71H preferably made of a dielectric, for example. Connection electrodes 72a and 72b, electrodes 72c and 72d and via hole conductors 73a and 73b are provided on and through the sheet 71A, a capacitor electrode 78a, conductor patterns 75a and 75b, and via hole conductors 73c to 73e are provided on and through the ceramic sheet 71B, and a capacitor electrode 78b and via hole conductors 73d to 73f are provided on and through the ceramic sheet 71C. Furthermore, conductor patterns 76a and 76b and via hole conductors 73e, 73f, 74a, 74b and 74d are provided on and through the ceramic sheet 71D, conductor patterns 76a and 76b and via holes conductors 73e, 73f, 74a, 74c and 74e are provided on and through the ceramic sheet 71E, a capacitor electrode 77, conductor patterns 76a and 76b and via hole conductors 73e, 73f, 74f and 74g are provided on and through the ceramic sheet 71F, conductor patterns 76a and 76b and via hole conductors 73e, 73f, 74f and 74g are provided on and through the ceramic sheet 71G, and conductor patterns 76a and 76b and a via hole conductor 73f are provided on and through the ceramic sheet 71H.

The ceramic sheets 71A to 71H are stacked on top of one another and thereby an inductance element L1 is defined by the conductor patterns 76a preferably connected in a helical shape, for example, through the via hole conductors 74c, 74d and 74g, an inductance element L2 is defined by the conductor patterns 76b preferably connected in a helical shape, for example, through the via hole conductors 74b, 74e and 74f, a capacitance element C1 is preferably defined by the capacitor electrodes 78a and 78b, and a capacitance element C2 is preferably defined by the capacitor electrodes 78b and 77.

One end of the inductance element L1 is connected to the capacitor electrode 78b through the via hole conductor 73d, the conductor pattern 75a and the via hole conductor 73c, and one end of the inductance element L2 is connected to the capacitor electrode 77 through the via hole conductor 74a. Furthermore, the other end the inductance element L1 and the other end of the inductance element L2 are connected each other on the ceramic sheet 71H and are connected to the connection electrode 72a through the via hole conductor 73e, the conductor pattern 75b and the via hole conductor 73a. Furthermore, the capacitor electrode 78a is electrically connected to the connection electrode 72b through the via hole conductor 73b.

In addition, the connection electrodes 72a to 72d are connected to the wireless IC 18 through the connection electrode 58.

Furthermore, external electrodes 79a and 79b are provided on the bottom surface of the feeder circuit board 70 preferably by coating conductor paste or other suitable method, for example, the external electrode 79a is coupled with the inductance elements L (L1 and L2) through a magnetic field, and the external electrode 79b is electrically connected to the capacitor electrode 78b through the via hole conductor 73f.

In addition, the inductance elements L1 and L2 are preferably configured such that the two conductor patterns 76a and 76b are arranged so as to be parallel or substantially parallel to each other. The two conductor patterns 76a and 76b preferably have different line lengths and can have different resonant frequencies, and the frequency band of the wireless IC device can be broadened.

Furthermore, each of the ceramic sheets 71A to 71H may preferably be a sheet made of a magnetic ceramic material, for example, and the feeder circuit board 70 can be more easily obtained using a process of manufacturing a multilayer board, such as a sheet lamination method or a thick film printing method used in the background art, for example.

In addition, the ceramic sheets 71A to 71H, for example, may be flexible sheets composed of a dielectric, such as polyimide or a liquid-crystal polymer, for example, electrodes and conductors may preferably be formed on the sheets by a thick film forming method, for example, these sheets may preferably be laminated by stacking the sheets on top of one another and subjecting them to thermocompression bonding or other suitable process, for example, and the inductance elements L1 and L2 and the capacitance elements C1 and C2 may preferably be built into the laminated sheets.

In the feeder circuit board 70, the inductance elements L1 and L2 and the capacitance elements C1 and C2 are arranged at different locations when viewed in plan, and the magnetic field generated by the inductance elements L1 and L2 is magnetically coupled to the external electrode 79a, and the external electrode 79b is one of the electrodes included in the capacitance element C1

Therefore, the electromagnetic coupling module 60 in which the wireless IC 18 is mounted on the feeder circuit board receives high-frequency signals through the antenna coil L from a reader/writer, which is not illustrated, causes the resonance circuit magnetically coupled with the external electrodes 79a and 79b through the antenna coil L to resonate, and supplies only received signals of a predetermined frequency band to the wireless IC 18. However, a predetermined amount of energy is extracted from the received signal and this energy is used as a driving source. After matching a predetermined frequency in the resonance circuit, a signal including information stored in the wireless IC 18 is transmitted to the reader/writer through external electrodes 79a and 79b and the antenna coil L.

In the feeder circuit board 70, a resonant frequency characteristic is determined in the resonance circuit defined by the inductance elements L1 and L2 and the capacitance elements C1 and C2. The frequency of a signal from the antenna coil L is substantially determined by the self-resonance frequency of the resonance circuit.

In addition, the remaining configuration of the wireless IC device 10f is the same or substantially the same as those of the wireless IC device 10a and therefore description thereof will be omitted. Furthermore, the feeder circuit board 70 can also be applied to the wireless IC devices 10b to 10e.

Variations of the resonant frequency during use can be prevented with the above-described wireless IC device 10f, in a similar manner as with the wireless IC device 10a.

Seventh Preferred Embodiment

Figure 16A:
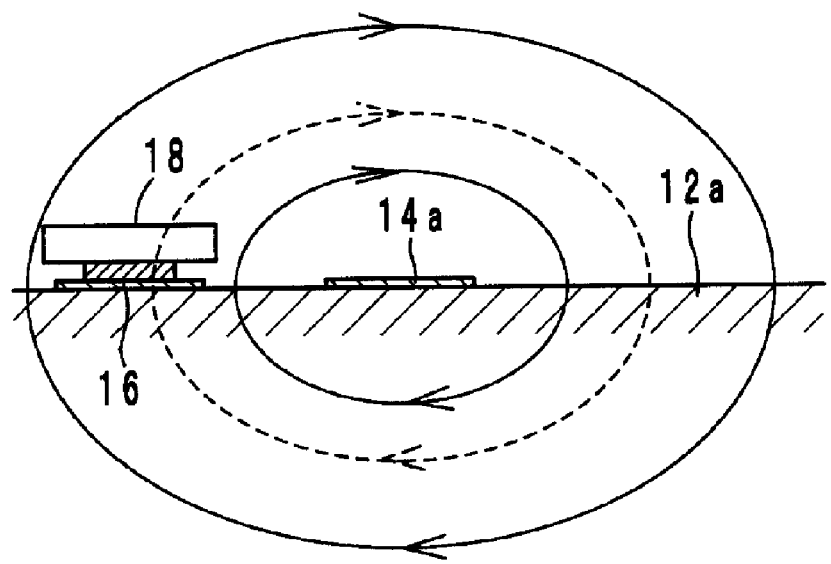
FIG. 16A is a sectional structural view of the vicinity of a wireless IC of a wireless IC device according to a reference example in the zy-plane and FIG. 16B is a sectional structural view of the vicinity of the wireless IC of the wireless IC device in the zy-plane.
Figure 16B:
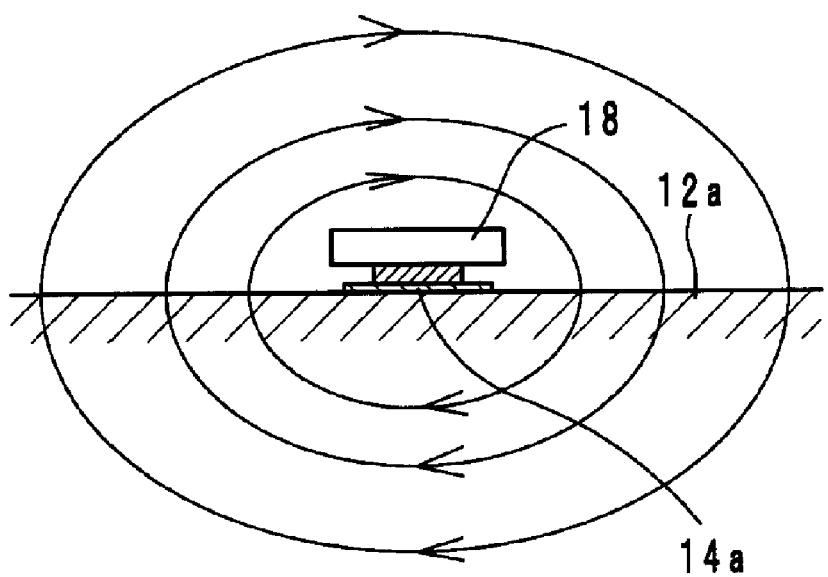

Hereafter, a wireless IC device according to a seventh preferred embodiment of the present invention will be described with reference to the drawings. FIG. 15 is an exploded perspective view of a wireless IC device 10g according to the seventh preferred embodiment. In FIG. 15, the x-axis extends in a direction of the long edges of the wireless IC device 10g, the y-axis extends in a direction of the short edges of the wireless IC device 10g, and the z-axis extends in a direction in which layers of the wireless IC device 10g are stacked. FIG. 16A is a sectional view in the vicinity of a wireless IC of a wireless IC device of a reference example in the zy-plane and FIG. 16B is a sectional view of the vicinity of the wireless IC 18 of the wireless IC device 10g in the zy-plane. In addition, in FIGS. 15, 16A, and 16B, components and features that are the same or substantially the same as those in FIGS. 1, 2A, and 2B are denoted by the same reference symbols.

The difference between the wireless IC device 10a and the wireless IC device 10g is that, in the wireless IC device 10g, the wireless IC 18 is configured so as to be superposed with a single ring defined by the plurality of coil electrodes 14a to 14c when viewed in plan from the z-axis direction. This difference will be described below.

In the wireless IC device 10g, the wireless IC 18 is arranged so as to be superposed with the single ring defined by the plurality of coil electrodes 14a to 14c when viewed in plan from the z-axis direction. Consequently, the wireless IC 18 is connected to one end of the coil electrode 14a.

Furthermore, one end of the connector 16 is arranged so as to be superposed with the single ring defined by the plurality of coil electrodes 14a to 14c and is connected to the wireless IC 18. The other end of the connector 16 extends to the inside of the single ring and is connected to a connector 20c through the via hole conductors b11 and b12.

In addition, the remaining configuration of the wireless IC device 10g is the same or substantially the same as those of the wireless IC device 10a and therefore description thereof will be omitted.

Variations of the resonant frequency during use can be effectively prevented with the wireless IC device 10g, in a similar manner as with the wireless IC device 10a.

Furthermore, with the wireless IC device 10g, as will be described below, when the insulating sheets 12 are bent, the load acting on the wireless IC 18 can be reduced. Since the insulating sheets 12 are flexible, the insulating sheets 12 are occasionally bent during in use. Since the wireless IC 18 includes a semiconductor substrate, the wireless IC 18 is more rigid than the insulating sheets 12. Therefore, when the insulating sheets 12 are bent, stress is concentrated on the wireless IC 18 and on a portion connecting the wireless IC 18 and the antenna coil L, and there is a risk that the wireless IC 18 could break or be disconnected from the antenna coil L.

Accordingly, in the wireless IC device 10g, the wireless IC 18 is arranged so as to be superposed with the single ring defined by the coil electrodes 14a to 14c. The single ring does not easily bend as compared to other components of the wireless IC device 10g, since the coil conductors 14a to 14c are superposed with one another. Consequently, even when the insulating sheets 12 are bent, significant bending of the portion in which the wireless IC 18 is arranged can be effectively prevented. As a result, the load acting on the wireless IC 18 and the portion connecting the wireless IC 18 and the antenna coil L is reduced.

Furthermore, with the wireless IC device 10g, as will be described below, magnetic field disturbance is not likely to be generated. In more detail, a magnetic field is generated so as to circulate around the coil electrodes 14. Therefore, if the wireless IC 18 were arranged so as not to be superposed with the coils 14a to 14c when viewed in plan from the z-axis direction, as with the wireless IC device of the reference example illustrated in FIG. 16A, then the magnetic field generated by the coil electrodes 14 would be disturbed. In other words, in the wireless IC device the reference example, magnetic flux disturbance is generated.

In contrast, in the wireless IC device 10g, the wireless IC 18 is arranged so as to be superposed with the coil electrodes 14a to 14c when viewed in plan from the z-axis direction.

Consequently, as illustrated in FIG. 16B, the magnetic field is generated so as to circulate around the coil electrodes 14a to 14c and the wireless IC device 18. Therefore, the wireless IC 18 does disturb the magnetic field. As a result, with the wireless IC device 10g, magnetic field disturbance is not likely to be generated.

Wireless IC devices according to preferred embodiments of the present invention are not limited to the above-described wireless IC devices 10a to 10g according to the first to seventh preferred embodiments and may be modified within the scope of the claims of the invention.

Furthermore, the phrase "the coil electrode 14 has a length less than one circuit" means that the coil electrode 14 has a length substantially less than one circuit. Therefore, the length of the coil electrode 14 may slightly exceed one circuit as long as the resonant frequency of the wireless IC device 10 does not vary during use.

In addition, although touching of the wireless IC device 10 by a person's hand was described as being the cause of the variations of the resonant frequency, causes of the variations of the resonant frequency are not limited to touching by a person's hand. For example, when the wireless IC device 10 is used after being inserted into a card case or other structure, the resonant frequency may vary due to the fact that the card case or other structure is in contact with the wireless IC device 10.

Furthermore, it is not necessary that the insulating sheet 12 have a rectangular shape, but it is preferable that no large holes or cut-out portions are provided inside the antenna coil L. If large holes or cut-out portions are provided in the insulating sheet 12 inside the antenna coil L, then there is a risk of, for example, the electric force lines E10a passing through the person's hand through the holes or cut-out portions when the person's finger Fin3 approaches from the left side of FIG. 2B.

In addition, in the wireless IC devices 10a to 10g, the coil electrodes 14, 24 and 34 are arranged so as to be superposed with one another in the line-width direction when viewed in plan from the z-axis direction. However, the coil electrodes 14, 24, and 34 on the lower side in the z-axis direction may slightly protrude with respect to the coil electrodes 14, 24 and 34 on the upper side in the z-axis direction when viewed in plan from the z-axis direction. However, it is necessary that the coil electrodes 14, 24 and 34 only protrude by an amount that does not adversely affect the resonant frequency.

Figure 17:
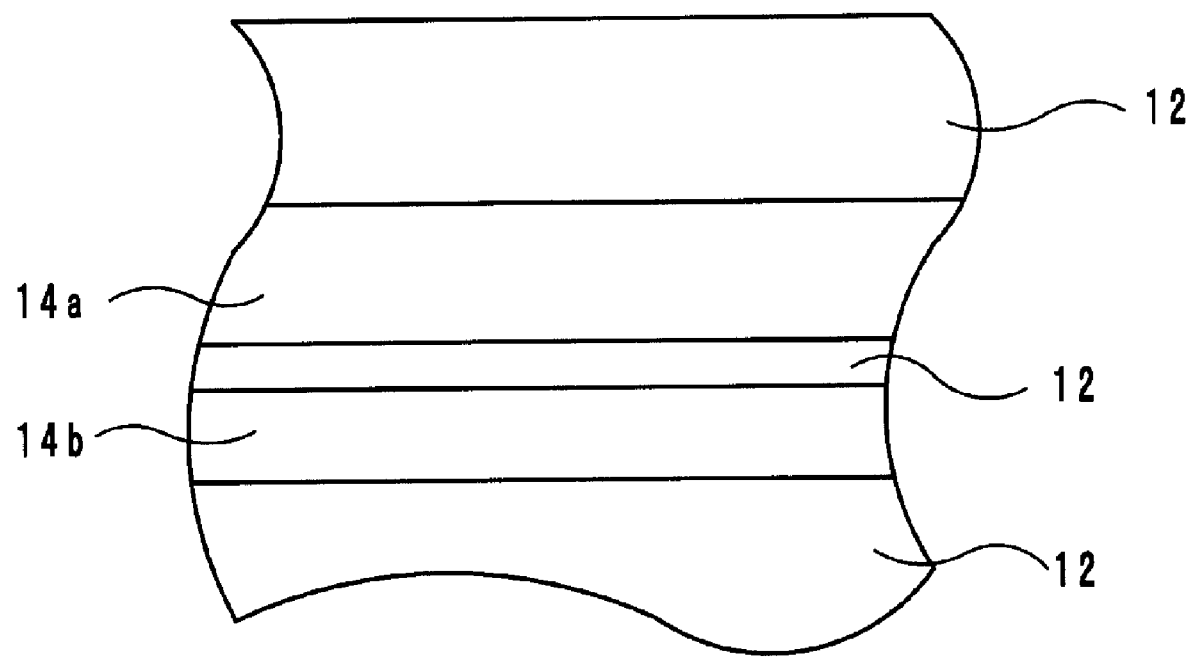
FIG. 17 is an enlarged view of a coil electrode of the wireless IC device of FIG. 1.

In particular, when the coil electrodes 14, 24 and 34 are arranged so as to be staggered with respect to one another, as in the enlarged view of the coil electrode 14a of the wireless IC device 10a illustrated in FIG. 17, when viewed in plan from the z-axis direction, the coil electrode 14a, which is arranged on the uppermost side in the z-axis direction, sandwiches the insulating sheet 12 in a through region of the ring defined by the coil electrodes 14a to 14d, and the coil electrodes 14a to 14d are separated from one another and must not be side by side with one another. This is because electric force lines are generated between the coil electrodes 14 that extend to the outside of the wireless IC device 10a when the coil electrodes 14 are side by side as in FIG. 17. Furthermore, for the same reason, the coil electrode 14d, which is arranged on the lowermost side in the z-axis direction when viewed in plan from the z-axis direction, sandwiches the insulating sheet in the interior of the ring defined by the coil electrodes 14a to 14d and the coil electrodes 14a to 14d are separated from one another and must not be side by side with one another. In addition, in FIG. 17, the wireless IC device 10a is described as an example. However, the arrangement shown in FIG. 17 also applied to the wireless IC devices 10b to 10g.

A method of manufacturing a wireless IC device according to a preferred embodiment of the present invention will be described with reference to the drawings. Hereafter, a method of manufacturing the wireless IC device 10d, as an example of a wireless IC device according to a preferred embodiment of the present invention, will be described. In addition, a method of manufacturing a wireless IC card 80 will be described. FIG. 18 is an exploded perspective view of the wireless IC card 80.

The insulating sheets 12 preferably made of, for example, a glass epoxy substrate, polyimide, polyvinyl chloride, polyethylene terephthalate (PET), PET-G or a liquid crystal polymer resin, for example, are prepared. On the respective insulating sheets 12, the coil electrodes 14 illustrated in FIG. 9 are formed. When the coil electrodes 14 are made of copper foil, the coil electrodes 14 are preferably formed by using for example an etching process, for example.

Furthermore, simultaneously with forming the coil electrodes 14, the connectors 16, 20a, 20b, 20c, 20d, 40c, 40d, 42b and 42c are also formed preferably using, for example, an etching process. On the insulating sheet 12a, the connector 20a, which is connected to the coil electrode 14a, is formed and the connector 16 is formed at a location separated from the connector 20a by an area in which the wireless IC 18 is to be mounted. Furthermore, when the insulating sheets 12a to 12d are stacked on top of one another, the connectors 42b and 42c are formed on the insulating sheets 12b and 12c so as to be superposed with the connector 16 when viewed in plan from the z-axis direction. Furthermore, simultaneously with forming the connectors 42b and 42c, the connectors 20b and 20c, which are connected to the coil electrodes 14b and 14c are also formed on the insulating sheets 12b and 12c. In addition, the connector 20d, which is connected to the coil electrode 14d, is also formed on the insulating sheet 12d and is superposed with the connector 16 when viewed in plan from the z-axis direction. Simultaneously with forming the connector 20d, the connector 40d, which is connected to the coil electrode 14d, is also formed on the insulating sheet 12d.

In addition, the coil electrodes 14a to 14d and the connectors 16, 20a, 20b, 20c, 20d, 40c, 40d, 42b and 42c may also preferably be formed using a screen printing method in which a conductive paste is applied, for example.

Next, the plurality of insulating sheets 12a to 12d are aligned and stacked on top of one another, such that the plurality of coil electrodes 14a to 14d are superposed with one another and thereby form a single ring when viewed in plan from the z-axis direction. At this time, the connectors 16, 42b, 42c and 20d are also superposed with one another when viewed in plan from the z-axis direction. Once stacking of the insulating sheets 12a to 12d is complete, the insulating sheets 12a to 12d are heated and pressure bonded.

Next, the coil electrode 14a and the coil electrode 14b, the connector 20b and the connector 20c, the connector 40c and the connector 40d, and the connector 16, the connector 42b, the connector 42c and the connector 20d are connected to one another at four locations preferably using a pouching process, for example. At this time, since the connector 16, the connector 42b, the connector 42c, and the connector 20d are superposed with one another when viewed in plan from the z-axis direction, they are connected together by performing a single pouching process.

Next, the wireless IC 18 is mounted on the connectors 16 and 20a of the insulating sheet 12a. Specifically, the wireless IC 18 is preferably mounted by performing a flip chip mounting process in which an anisotropic conductive film (ACF) is used, for example. At this time, after the wireless IC 18 has been aligned and temporarily affixed so as to be connected to the connectors 16 and 20a, hot pressing is performed so as to attach the wireless IC 18. By performing the above process, the wireless IC device 10d is completed.

Once the wireless IC device 10d has been completed, as illustrated in FIG. 18, the wireless IC card 80 is manufactured by attaching overlay sheets 82a and 82b preferably using adhesive sheets 84a and 84b, for example. The adhesive sheet 84a and the overlay sheet 82a are stacked on the upper side of the wireless IC device 10d in the z-axis direction and the adhesive sheet 84b and the overlay sheet 82b are stacked on the lower side of the wireless IC device 10d. Then, heating and pressure bonding are performed. Thus, the wireless IC card 80 is completed.

In addition, in the method of manufacturing a wireless IC device, a method of manufacturing the wireless IC device 10d was described, but the wireless IC devices 10a to 10c can be manufactured using substantially the same manufacturing method. However, in the wireless IC devices 10a to 10c, the coil electrodes 14, 24 and 34 are connected to one another using the via hole conductors b instead of by a pouching process. Therefore, a step of forming the via hole conductors b in the respective insulating sheets 12 is performed instead of the step of performing the pouching process. The via hole conductors b are preferably formed by irradiating the insulating sheets 12 with a laser beam to form via holes and then filling the via holes with a conductive paste, for example. In particular, when the coil electrodes 14, 24 and 34 are formed by a screen printing method, simultaneously with the step of filling the via holes with the conductive paste, the coil electrodes 14, 24 and can be formed by applying the conductive paste to the insulating sheets 12.

In addition, when manufacturing the wireless IC device 10f, the electromagnetic coupling module 60, which includes the wireless IC 18 and the feeder circuit board 70, is mounted instead of the wireless IC 18.

Preferred embodiments of the present invention are advantageous for wireless IC devices and methods of manufacturing wireless IC devices, and are particularly advantageous to effectively prevent variations of a resonant frequency during use.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A wireless IC device comprising:
an insulating sheet;
a plurality of coil electrodes defining an antenna coil and being arranged so as to sandwich the insulating sheet therebetween and to be connected to one another; wherein
the plurality of coil electrodes are superposed with one another so as to define a single ring when viewed in plan from a direction extending perpendicular or substantially perpendicular to a direction in which a main surface of the insulating sheet extends;
the insulating sheet includes a plurality of stacked layers and certain ones of the plurality of coil electrodes arranged at both ends in the direction extending perpendicular or substantially perpendicular to the direction in which the main surface of the insulating sheet extends wind through a length of less than one circuit around a coil axis of the antenna coil;
a minimum value of a distance between an outer edge of the single ring and outer edges of the insulating sheet is greater than a distance in the direction extending perpendicular or substantially perpendicular to the direction in which the main surface of the insulating sheet extends between the plurality of coil electrodes; and
the plurality of coil electrodes and the plurality of stacked layers of the insulating sheet are arranged to prevent leaking of electric force lines generated between the plurality of coil electrodes so as to prevent variations of a resonant frequency of the wireless IC device due to changes of a capacitance generated in the plurality of coil electrodes due to the manner in which the wireless IC device is held.

2. The wireless IC device according to claim 1, wherein the coil electrodes arranged at both ends have a line width greater than remaining coil electrodes of the plurality of coil electrodes.

3. The wireless IC device according to claim 2, wherein the coil electrodes arranged at both ends cover at least a portion of the remaining coil electrodes when viewed in plan from the direction extending perpendicular or substantially perpendicular to the direction in which a main surface of the insulating sheet extends.

4. The wireless IC device according to claim 1, wherein remaining ones of the plurality of coil electrodes other than those arranged at both ends wind through a length of at least one circuit around the coil axis.

5. The wireless IC device according to claim 1, further comprising:
a wireless IC that is connected to the antenna coil and arranged to process transmission and reception signals.

6. The wireless IC device according to claim 5, further comprising:
a first connector connected to the wireless IC and connected to the coil electrode on a layer of the plurality of layers of the insulating sheet arranged on an uppermost side in the direction extending perpendicular or substantially perpendicular to the direction in which a main surface of the insulating sheet extends;
a second connector connected to the wireless IC on a layer of the plurality of layers of the insulating sheet that is positioned on the uppermost side in the direction extending perpendicular or substantially perpendicular to the direction in which a main surface of the insulating sheet extends;
a third connector arranged on one of the plurality of layers of the insulating sheet other than the layers of the insulating sheets arranged on the uppermost side and on a lowermost side in the direction extending perpendicular or substantially perpendicular to the direction in which a main surface of the insulating sheet extends and superposed with the second connector when viewed in plan from the direction extending perpendicular or substantially perpendicular to the direction in which a main surface of the insulating sheet extends; and
a fourth connector connected to the coil electrode on the layer of the insulating sheet arranged on the lowermost side in the direction extending perpendicular or substantially perpendicular to the direction in which a main surface of the insulating sheet extends and superposed with the second connector when viewed in plan from the direction extending perpendicular or substantially perpendicular to the direction in which a main surface of the insulating sheet extends; wherein
the first connector, the second connector, the third connector, and the fourth connector are connected to one another at the same or substantially the same location when viewed in plan from the direction extending perpendicular or substantially perpendicular to the direction in which a main surface of the insulating sheet extends.

7. The wireless IC device according to claim 5, wherein the wireless IC is arranged so as to be superposed with the single ring defined by the plurality of coil electrodes when viewed in plan from the direction extending perpendicular or substantially perpendicular to the direction in which a main surface of the insulating sheet extends.

8. The wireless IC device according to claim 1, further comprising:
an electromagnetic coupling module that includes a wireless IC that processes transmission and reception signals and a feeder circuit board including an inductance element connected to the wireless IC and connected to the antenna coil.

9. The wireless IC device according to claim 8, further comprising:
a first connector that connected to the feeder circuit board and the coil electrode on a layer of the plurality of layers of the insulating sheet that is arranged on an uppermost side in the direction extending perpendicular or substantially perpendicular to the direction in which a main surface of the insulating sheet extends;
a second connector connected to the feeder circuit board on the layer of the insulating sheet that is arranged on the uppermost side in the direction extending perpendicular or substantially perpendicular to the direction in which a main surface of the insulating sheet extends;
a third connector arranged on a layer of the plurality of layers of the insulating sheets other than the layers of the insulating sheets arranged on the uppermost side and a lowermost side in the direction extending perpendicular or substantially perpendicular to the direction in which a main surface of the insulating sheet extends and being superposed with the second connector when viewed in plan from the direction extending perpendicular or substantially perpendicular to the direction in which a main surface of the insulating sheet extends; and
a fourth connector connected to the coil electrode on a layer of the plurality of layers of the insulating sheet arranged on the lowermost side in the direction extending perpendicular or substantially perpendicular to the direction in which a main surface of the insulating sheet extends and being superposed with the second connector when viewed in plan from the direction extending perpendicular or substantially perpendicular to the direction in which a main surface of the insulating sheet extends;
wherein the first connector, the second connector, the third connector, and the fourth connector are connected to one another at the same or substantially the same location when viewed in plan from the direction extending perpendicular or substantially perpendicular to the direction in which a main surface of the insulating sheet extends.

10. The wireless IC device according to claim 1, further comprising:
a connection conductor arranged at a location superposed with the coil electrodes arranged at both ends the direction extending perpendicular or substantially perpendicular to the direction in which a main surface of the insulating sheet extends and to connect the plurality of coil electrodes to one another.

11. The wireless IC device according to of claim 1, wherein a coil
electrode of the plurality of coil electrodes arranged on an uppermost side or a coil electrode of the plurality of coil electrodes arranged on a lowermost side in the direction extending perpendicular or substantially perpendicular to the direction in which a main surface of the insulating sheet extends is separated from and is not side by side with the plurality of coil electrodes in a through region of the ring.

12. A method of manufacturing a wireless IC device, comprising:
a step of forming coil electrodes on a plurality of insulating sheets; and
a step of stacking the plurality of insulating sheets on top of one another such that the coil electrodes are superposed with one another and thereby form a single ring when viewed in plan from a direction extending perpendicular or substantially perpendicular to a direction in which main surfaces of the plurality of insulating sheets extend; wherein
certain ones of the coil electrodes arranged at both ends in the direction extending perpendicular or substantially perpendicular to the direction in which the main surface of the plurality of insulating sheets extends wind through a length of less than one circuit around a coil axis of the single ring;
a minimum value of a distance between an outer edge of the single ring and outer edges of the plurality of insulating sheets is greater than a distance in the direction extending perpendicular or substantially perpendicular to the direction in which the main surface of the plurality of insulating sheets extends between the coil electrodes; and
the coil electrodes and the plurality of stacked insulating sheets are arranged to prevent leaking of electric force lines generated between the coil electrodes so as to prevent variations of a resonant frequency of the wireless IC device due to changes of a capacitance generated in the coil electrodes due to the manner in which the wireless IC device is held.

13. The method of manufacturing the wireless IC device according to claim 12, further comprising:
a step of forming a first connector that is connected to a coil electrode of the coil electrode arranged on an insulating sheet the plurality of insulating sheets that is arranged on an uppermost side in the direction extending perpendicular or substantially perpendicular to the direction in which main surfaces of the plurality of insulating sheet extend;
a step of forming a second connector on an insulating sheet of the plurality of insulating sheets that is arranged on the uppermost side in the direction extending perpendicular or substantially perpendicular to the direction in which main surfaces of the plurality of insulating sheet extend;
a step of forming a third connector on one of the plurality of insulating sheets other than the insulating sheets arranged on the uppermost side and a lowermost side in the direction extending perpendicular or substantially perpendicular to the direction in which main surfaces of the plurality of insulating sheet extend and that is superposed with the second connector when viewed in plan from the direction extending perpendicular or substantially perpendicular to the direction in which main surfaces of the plurality of insulating sheet extend;
a step of forming a fourth connector that is connected to the coil electrode on the insulating sheet arranged on the lowermost side in the direction extending perpendicular or substantially perpendicular to the direction in which main surfaces of the plurality of insulating sheet extend and that is superposed with the second connector when viewed in plan from the direction extending perpendicular or substantially perpendicular to the direction in which main surfaces of the plurality of insulating sheet extend; and a step of connecting the first connector, the second connector, the third connector, and the fourth connector together, after stacking the plurality of insulating sheets on top of one another.

14. The method of manufacturing a wireless IC device according to claim 13, further comprising:

a step of mounting a wireless IC that processes transmission and reception signals such that the wireless IC is connected to the first connector and the second connector.

15. The method of manufacturing a wireless IC device according to claim 13, further comprising:

a step of mounting an electromagnetic coupling module that includes a wireless IC that processes transmission and reception signals and a feeder circuit board including an inductance element that is connected to the wireless IC so that the electromagnetic coupling module is connected to the first connector and the second connector.

16. The method of manufacturing a wireless IC device according to claim 12, further comprising:

a step of forming a connection conductor arranged to connect the coil electrodes on the plurality of insulating sheets to one another.

\* \* \* \* \*